US012496524B2

(12) United States Patent
Templon et al.

(10) Patent No.: US 12,496,524 B2
(45) Date of Patent: Dec. 16, 2025

(54) SYSTEMS AND METHODS FOR AUTOMATIC MEDIA GENERATION FOR GAME SESSIONS

(71) Applicant: GameChanger Media, Inc., New York, NY (US)

(72) Inventors: John Robert Templon, New York, NY (US); Michelle Deanna Alvero Myers, San Francisco, CA (US)

(73) Assignee: GameChanger Media, Inc., New York, NY (US)

( * ) Notice: Subject to any disclaimer, the term of this patent is extended or adjusted under 35 U.S.C. 154(b) by 303 days.

(21) Appl. No.: 18/142,880

(22) Filed: May 3, 2023

(65) Prior Publication Data

US 2024/0367051 A1 Nov. 7, 2024

(51) Int. Cl.
*A63F 13/60* (2014.01)

(52) U.S. Cl.
CPC .................................... *A63F 13/60* (2014.09)

(58) Field of Classification Search
None
See application file for complete search history.

(56) References Cited

U.S. PATENT DOCUMENTS

| | | | |
|---|---|---|---|
| 8,228,372 | B2 | 7/2012 | Griffin |
| 8,688,434 | B1 | 4/2014 | Birnbaum et al. |
| 8,775,161 | B1 | 7/2014 | Nichols et al. |
| 8,843,363 | B2 | 9/2014 | Birnbaum et al. |
| 8,886,520 | B1 | 11/2014 | Nichols et al. |
| 8,892,417 | B1 | 11/2014 | Nichols et al. |
| 9,202,526 | B2 | 12/2015 | Hohteri et al. |
| 9,396,168 | B2 | 7/2016 | Birnbaum et al. |

(Continued)

FOREIGN PATENT DOCUMENTS

| | | |
|---|---|---|
| EP | 3 915 658 | 12/2021 |
| IN | 2010MU00549 | 7/2010 |
| KR | 20170022122 A | 3/2017 |

OTHER PUBLICATIONS

Guo et al., "Conditional Text Generation for Harmonious Human-Machine Interaction," (2021) ACM Transactions on Intelligent Systems and Technology, vol. 12, No. 2, Article 14 (Feb. 2021), 50 pages.

(Continued)

*Primary Examiner* — Jason T Yen
(74) *Attorney, Agent, or Firm* — Foley & Lardner LLP

(57) ABSTRACT

In some aspects, the disclosure is directed to systems and methods for automatic text generation for game sessions. A system may include one or more processors that are configured to store an identification of a game session and data corresponding to one or more events of the game session, the game session corresponding to one or more characteristics of individuals participating in the game session; determine, based on the one or more characteristics of the individuals participating in the game session, a set of criteria for selecting a set of media segments, wherein different criteria of the set of criteria correspond to different media segments; determine which of the set of criteria is satisfied; select one or more media segments based on the satisfied criteria; and generate a media content item for at least a portion of the game session based on the selected one or more media segments.

16 Claims, 8 Drawing Sheets

(56) References Cited

U.S. PATENT DOCUMENTS

| | | | |
|---|---|---|---|
| 9,519,635 | B2 | 12/2016 | Allen et al. |
| 9,535,879 | B2 | 1/2017 | Allen |
| 9,576,009 | B1 | 2/2017 | Hammond et al. |
| 9,602,858 | B1 | 3/2017 | Kaiser et al. |
| 9,697,197 | B1 | 7/2017 | Birnbaum et al. |
| 9,720,899 | B1 | 8/2017 | Birnbaum et al. |
| 9,807,283 | B1 | 10/2017 | Kaiser et al. |
| 10,025,986 | B1 | 7/2018 | Grieb et al. |
| 10,185,477 | B1 | 1/2019 | Paley et al. |
| 10,212,325 | B2 | 2/2019 | Lokshin et al. |
| 10,262,692 | B2 | 4/2019 | Tamir et al. |
| 10,321,208 | B2 | 6/2019 | Lokshin et al. |
| 10,659,672 | B2 | 5/2020 | Lokshin et al. |
| 10,699,079 | B1 | 6/2020 | Paley et al. |
| 10,747,823 | B1 | 8/2020 | Birnbaum et al. |
| 10,762,304 | B1 | 9/2020 | Paley et al. |
| 10,897,659 | B2 | 1/2021 | Lokshin et al. |
| 10,970,554 | B2 | 4/2021 | Oz et al. |
| 10,990,767 | B1 | 4/2021 | Smathers et al. |
| 11,023,688 | B1 * | 6/2021 | Holmdahl ............... G06F 40/30 |
| 11,023,689 | B1 | 6/2021 | Sippel et al. |
| 11,042,713 | B1 | 6/2021 | Platt et al. |
| 11,087,095 | B1 | 8/2021 | Long et al. |
| 11,188,759 | B2 | 11/2021 | Elder et al. |
| 11,310,418 | B2 | 4/2022 | Taxbol et al. |
| 11,516,557 | B2 | 11/2022 | Lokshin et al. |
| 11,553,126 | B2 | 1/2023 | Lokshin et al. |
| 11,562,146 | B2 | 1/2023 | Paley et al. |
| 11,615,621 | B2 | 3/2023 | Stojancic et al. |
| 11,704,892 | B2 | 7/2023 | Velardo |
| 2008/0076519 | A1 * | 3/2008 | Chim ...................... G07F 17/32 463/20 |
| 2009/0315978 | A1 | 12/2009 | Warmlin et al. |
| 2012/0038776 | A1 | 2/2012 | Ahiska et al. |
| 2013/0337889 | A1 * | 12/2013 | Gagner ................. G07F 17/323 463/36 |
| 2014/0376874 | A1 | 12/2014 | Aman et al. |
| 2016/0188172 | A1 | 6/2016 | Hohteri et al. |
| 2016/0241768 | A1 | 8/2016 | Lokshin et al. |
| 2017/0118539 | A1 | 4/2017 | Lokshin et al. |
| 2017/0266568 | A1 * | 9/2017 | Lucas ................... A63F 13/497 |
| 2017/0300477 | A1 | 10/2017 | Long et al. |
| 2018/0132011 | A1 | 5/2018 | Shichman et al. |
| 2019/0182417 | A1 | 6/2019 | Lokshin et al. |
| 2019/0222776 | A1 | 7/2019 | Carter et al. |
| 2019/0261065 | A1 | 8/2019 | Lokshin et al. |
| 2020/0082276 | A1 | 3/2020 | Nichols et al. |
| 2020/0125879 | A1 | 4/2020 | Diehl |
| 2020/0218901 | A1 | 7/2020 | Elder et al. |
| 2020/0275008 | A1 | 8/2020 | Lokshin et al. |
| 2020/0298113 | A1 | 9/2020 | Smithers |
| 2021/0093969 | A1 | 4/2021 | Mccoy et al. |
| 2021/0097232 | A1 | 4/2021 | Long et al. |
| 2021/0136466 | A1 | 5/2021 | Lokshin et al. |
| 2021/0287118 | A1 | 9/2021 | Pierce et al. |
| 2022/0027631 | A1 | 1/2022 | Stojancic et al. |
| 2022/0171957 | A1 | 6/2022 | Sahai et al. |
| 2022/0319103 | A1 | 10/2022 | Lucas |
| 2023/0053724 | A1 | 2/2023 | Birnbaum et al. |
| 2023/0077815 | A1 | 3/2023 | Lokshin et al. |
| 2023/0092774 | A1 | 3/2023 | Velardo |
| 2023/0099034 | A1 | 3/2023 | Le |
| 2023/0109572 | A1 | 4/2023 | Nichols et al. |
| 2023/0142035 | A1 | 5/2023 | Lokshin et al. |
| 2023/0252653 | A1 | 8/2023 | Stuurman et al. |
| 2023/0290144 | A1 | 9/2023 | Oz et al. |

OTHER PUBLICATIONS

Partial International Search Report in International Application No. PCT/US2024/047256, dated Dec. 10, 2024.
PCT International Search Report and Written Opinion in International Application No. PCT/US2024/047256, dated Feb. 3, 2025.
Arev, I., "Automatic Editing of Footage from Multiple Social Cameras," (2015) The Interdisciplinary Center, Herzlia EFI Arazi School of Computer Science, 44 pgs.
International Search Report and Written Opinion for International Application No. PCT/US2024/048665, dated Jan. 8, 2025, 20 pgs.
Le et al., "Deep Reinforcement Learning in Computer Vision: A Comprehensive Survey," ARXIV.org, Cornell University Library, 201 Olin Library, Cornell University, Ithaca, NY 14853, Aug. 25, 2021, 103 pgs.
Li et al., "Automatic Detection and Analysis of Player Action in Moving Background Sports Video Sequences," (2010) IEEE Transactions on Circuits and Systems for Video Technology, vol. 20, No. 3, Mar. 2010, 14 pgs.

* cited by examiner

600

Aidan Risse Leads La Jolla Country Day Torreys Varsity Past Mira Mesa. Aidan Risse collected three hits in three at bats, as La Jolla Country Day Torreys Varsity defeated Mira Mesa 16-0 on Wednesday. An early lead helped propel La Jolla Country Day Torreys Varsity to victory. La Jolla Country Day Torreys Varsity scored two runs on a single in the first inning. A single by Vincenzo Lucia, an error, a wild pitch, and a wild pitch helped La Jolla Country Day Torreys Varsity extend their early lead in the second. A fielder's choice by Vincenzo Lucia, and a single by Johnny Luetzow helped La Jolla Country Day Torreys Varsity extend their early lead in the third. La Jolla Country Day Torreys Varsity added three more runs in the bottom of the fourth inning on three hits. Joseph Cetale doubled, scoring one run, and Aidan Risse homered, scoring two runs. Ben Pajak and Alvaro Partida each appeared in relief for La Jolla Country Day Torreys Varsity. Joseph Cetale and Aidan Risse each collected three hits for La Jolla Country Day Torreys Varsity. Johnny Luetzow and Zach Schwartzberg each drove in three runs for La Jolla Country Day Torreys Varsity. Jake Bold, Chris Esquivel, Vincenzo Lucia, Johnny Luetzow, and Zach Schwartzberg each stole multiple bases for La Jolla Country Day Torreys Varsity. La Jolla Country Day Torreys Varsity didn't commit a single error in the field. Joseph Cetale had the most chances in the field with 10. Tyler King led Mira Mesa with one hit in three at bats.

FIG. 6

SYSTEMS AND METHODS FOR AUTOMATIC MEDIA GENERATION FOR GAME SESSIONS

BACKGROUND OF THE DISCLOSURE

Media generation systems, such as Natural Language Processing (NLP) systems, have become increasingly important in recent years as more businesses and individuals rely on digital communication and automation. Media generation systems can use computer algorithms to analyze, interpret, and generate human language, enabling computers to interact with humans in a more natural and intuitive way.

One challenge that media generation systems face is generating situation or context-specific content. For example, an NLP system may be configured or trained to generate text summaries or descriptions of different situations based on data regarding the situations. The NLP system may generate the same text summaries or descriptions regardless of any background information that is unique to each situation. Without taking such background information into account, the NLP may generate summaries or descriptions that are incorrect or inappropriate for the individual situations.

SUMMARY OF THE DISCLOSURE

In one aspect, the present disclosure describes one or more non-transitory computer-readable media for automatic text generation for game sessions, the non-transitory computer readable media including instructions which, when executed by one or more processors, cause the one or more processors to store an identification of a game session and data corresponding to one or more events of the game session, the game session corresponding to one or more characteristics of individuals participating in the game session; determine, based on the one or more characteristics of the individuals participating in the game session, a set of criteria for selecting a set of media segments, wherein different criteria of the set of criteria correspond to different media segments; determine which of the set of criteria is satisfied based on the stored data corresponding to the one or more events of the game session; select one or more media segments based on the satisfied criteria; and responsive to determining an occurrence of a predetermined event, generate a media content item for at least a portion of the game session based on the selected one or more media segments.

In another aspect, the present disclosure describes a system for automatic media generation for game sessions. The system can include one or more processors coupled to one or more computer-readable storage media, the one or more processors can be configured to execute instructions stored on the one or more computer-readable storage media to store an identification of a game session and data corresponding to one or more events of a game session, the game session corresponding to a type of game and at least one of an age, an age range, or an experience level of individuals participating in the game session; determine a threshold based on the type of game and the at least one of the age, the age range, or the experience level of individuals participating in the game session, the threshold corresponding to a media segment; determine the threshold is satisfied based on the stored data for the game session; and responsive to determining that the game session has ended, generate a media content item for the game session based at least on the media segment.

In another aspect, the present disclosure describes a method for automatic media generation for game sessions. The method can include storing, by one or more processing circuits, an identification of a game session and data corresponding to one or more events of the game session, the game session corresponding to one or more characteristics of individuals participating in the game session; determining, by the one or more processing circuits and based on the one or more characteristics of the individuals participating in the game session, a set of criteria for selecting a set of media segments, wherein different criteria of the set of criteria correspond to different media segments; determining, by the one or more processing circuits, which of the set of criteria is satisfied based on the stored data corresponding to the one or more events of the game session; and responsive to determining an occurrence of a predetermined event, generating, by one or more processing circuits, a media content item for at least a portion of the game session based on the one or more media segments.

In another aspect, the present disclosure describes one or more non-transitory computer-readable media for automatic text generation for game sessions, the non-transitory computer readable media including instructions which, when executed by one or more processors, cause the one or more processors to store an identification of a game session and data corresponding to one or more events of the game session, the game session corresponding to one or more characteristics of individuals participating in the game session; determine, based on the one or more characteristics of the individuals participating in the game session, a set of criteria for generating a set of media segments, wherein different criteria of the set of criteria correspond to different media segments; determine which of the set of criteria is satisfied based on the stored data corresponding to the one or more events of the game session; populate, with values from the stored data corresponding to the one or more events of the game session, portions of one or more media segments that correspond with the satisfied criteria; and responsive to determining an occurrence of a predetermined event, generate a media content item for at least a portion of the game session based on the one or more media segments populated with the values from the data corresponding to the one or more events of the game session.

In some embodiments, execution of the instructions causes the one or more processors to determine the set of criteria by determining a threshold for a category based on the one or more characteristics; and wherein execution of the instructions causes the one or more processors to determine a criterion of the set of criteria is satisfied responsive to determining a value of the category in the data corresponding to the one or more events exceeds the threshold. In some embodiments, execution of the instructions causes the one or more processors to determine the threshold for the category by retrieving one or more values for the category from stored data corresponding to one or more events of one or more game sessions completed prior to the game session and corresponding to the one or more characteristics of individuals participating in the game session; and calculating the threshold for the category based on the retrieved one or more values.

In some embodiments, execution of the instructions causes the one or more processors to calculate the threshold for the category by generating a distribution of the retrieved values for the category of the stored data corresponding to the one or more events of the one or more game sessions; and determining a threshold value at a defined percentile of the distribution to be the threshold. In some embodiments, the one or more characteristics include an age or an age range.

In some embodiments, the one or more media segments that correspond with the satisfied criteria correspond to a priority value; and wherein execution of the instructions causes the one or more processors to generate the media content item by selecting a subset of the one or more media segments based on the priority values of the one or more media segments; and generating the media content item from only the subset of the one or more media segments. In some embodiments, the one or more media segments each correspond to one of a plurality of categories, the plurality of categories including a game session summary category, a sequence category, and a team summary category.

In some embodiments, execution of the instructions causes the one or more processors to store a first rule indicating only a defined number of media segments that correspond with the game session summary category can be used in a media content item; and store a second rule indicating any number of media segments that correspond with the sequence category or the team summary category can be used in a media content item. In some embodiments, the media segments that correspond with the team summary category correspond with thresholds determined based on characteristics of participants of game sessions. In some embodiments, execution of the instructions causes the one or more processors to receive an indication of a beginning of the game session; generate the identification for the game session in response to receiving the indication of the beginning of the game session; transmit the identification for the game session to a computing device; and receive, from the computing device, a message including the identification for the game session and an indication of an ending of the game session; and determining the occurrence of the predetermined event responsive to the indication of the ending of the game session.

In some embodiments, execution of the instructions causes the one or more processors to receive the data corresponding to the one or more events of the game session in a plurality of messages between a first time at the beginning of the game session and a second time at the ending of the game session, each of the plurality of messages including the identification for the game session; and store an association between the identification for the game session and the data corresponding to the one or more events of the game session responsive to identifying the identification for the game session in each of the plurality of messages. In some embodiments, each media segment is a text string, an audio segment, or a video segment.

In some embodiments, execution of the instructions causes the one or more processors to generate the media content item for the game session by selecting a template from a plurality of templates, each template corresponding to a different order in which to insert media segments into a media content item; and generating the media content item according to the selected template using the one or more media segments populated with the values from the data corresponding to the one or more events of the game session.

In some embodiments, execution of the instructions causes the one or more processors to generate the media content item for the game session by concatenating the one or more media segments together. In some embodiments, execution of the instructions causes the one or more processors to transmit the media content item to a computing device. In some embodiments, execution of the instructions causes the one or more processors to generate the media content item for the game session in response receiving an identification of the predetermined event for the game session.

In another aspect, the present disclosure describes a method for automatic text generation for game sessions. The method may include storing, by one or more processing circuits, an identification of a game session and data corresponding to one or more events of the game session, the game session corresponding to one or more characteristics of individuals participating in the game session; determining, by the one or more processing circuits and based on the one or more characteristics of the individuals participating in the game session, a set of criteria for generating a set of media segments, wherein different criteria of the set of criteria correspond to different media segments; determining, by the one or more processing circuits, which of the set of criteria is satisfied based on the stored data corresponding to the one or more events of the game session; populating, by the one or more processing circuits with values from the stored data corresponding to the one or more events of the game session, portions of one or more media segments that correspond with the satisfied criteria; and responsive to determining an occurrence of a predetermined event, generating, by one or more processing circuits, a media content item for at least a portion of the game session based on the one or more media segments populated with the values from the data corresponding to the one or more events of the game session.

In some embodiments, determining the set of criteria includes determining, by the one or more processing circuits, a threshold for a category based on the one or more characteristics; and wherein determining a criterion of the set of criteria is satisfied includes determining, by the one or more processing circuits, the criterion is satisfied responsive to determining a value of the category in the data corresponding to the one or more events of the game session exceeds the threshold. In some embodiments, determining the threshold for the category includes retrieving, by the one or more processing circuits, one or more values for the category from stored data corresponding to one or more events of one or more game sessions completed prior to the game session and corresponding to the one or more characteristics of individuals participating in the game session; and calculating, by the one or more processing circuits, the threshold for the category based on the retrieved one or more values.

In another aspect, the present disclosure describes a system for automatic text generation for game sessions. The system may include one or more processors coupled to one or more computer-readable storage media, the one or more processors configured to execute instructions stored on the one or more computer-readable storage media to store an identification of a game session and data corresponding to one or more events of a game session, the game session corresponding to a type of game and at least one of an age, an age range, or an experience level of individuals participating in the game session; determine a threshold based on the type of game and the at least one of the age, the age range, or the experience level of individuals participating in the game session, the threshold corresponding to a media segment; determine the threshold is satisfied based on the stored data for the game session; populate, with one or more values from the stored data for the game session, portions of the media segment responsive to determining the threshold is satisfied; and responsive to determining that the game session has ended, generate a media content item for the game session based at least on the media segment.

In some embodiments, the experience level includes one or more of a participation level of a plurality of participation levels of an organization, an amount of time an individual has participated in game sessions of the type of game, a skill rating, a skill rating range, a number of game sessions an individual has participated in game sessions of the type of game, a type of an organization, or an identifier of an organization.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 6 depicts an example text summary generated by a system for automatic media generation, according to some implementations.

Figure 1:
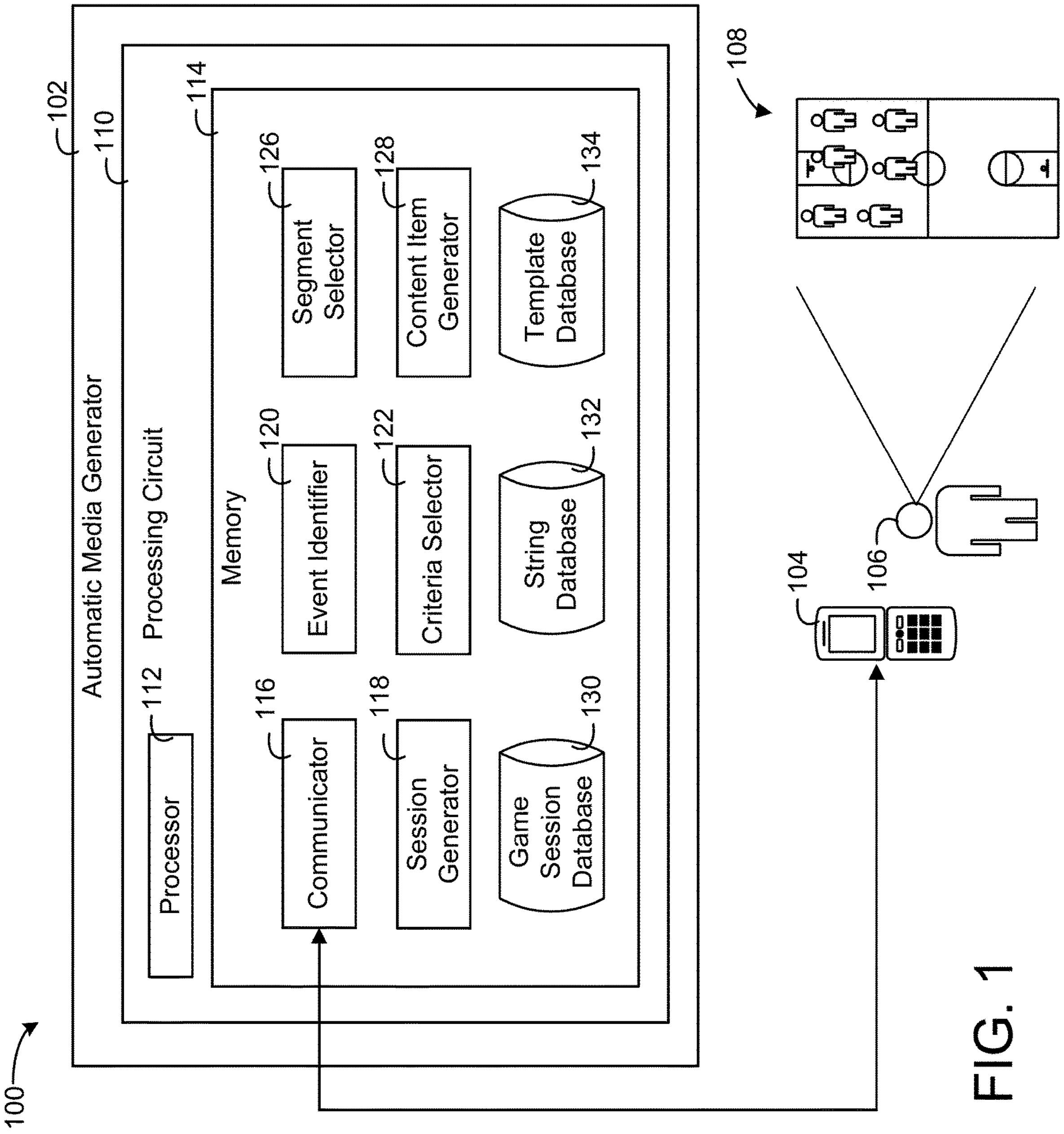
FIG. 1 is a block diagram of a system for automatic media generation for game sessions, according to some implementations.

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:

Section A describes embodiments of systems and methods for automatic media generation for game sessions; and Section B describes a computing environment which can be used for practicing embodiments described herein.

A. Systems and Methods for Automatic Media Generation for Game Sessions

Media generation systems may be configured to generate media content items (e.g., text summaries (e.g., descriptions), audio summaries or audio files, video summaries or video files, etc.) of game sessions. Game sessions may be, for example, sessions of activities in which participants compete, play, or participate to accomplish a goal, either individually or in teams. Examples of such activities can include sports (e.g., soccer, basketball, tennis, hockey, football, golf, etc.), electronic sports (E-sports) (e.g., competitive video games), games (e.g., chess, checkers, board games, etc.), or other activities. In one example, an NLP system may generate descriptions of events that occur during a game session by processing statistics or values regarding the game session and generating a text output. The NLP system may collect data regarding how individuals and/or teams performed during the game session and/or the end result of the game session. The NLP system may implement machine learning or other techniques using the statistics or values to output strings of sentences to generate a summary of what occurred during the game session.

Different media content items may be appropriate for game sessions with participants that have different characteristics. For example, basketball teams with younger players may not score as many points as basketball teams with older players because the teams with younger players may play shorter games or may have more difficulty shooting a basketball through a hoop. In another example, soccer teams that are more experienced may score fewer goals because the teams are playing other teams with higher experience that make scoring goals more difficult. In another example, the participants of an amateur organization may score fewer points in football than participants of a professional organization. Because of the differences in characteristics between participants of game sessions, different descriptions of the game sessions may be appropriate (e.g., a score for a game session played by younger players may be described as a high scoring game while the same score for a game session played by older players may be considered a low scoring game session). However, conventional NLP or other media generation systems may not be able to differentiate between such game sessions and generate identical or similar summaries or media content items regardless of the characteristics of the participants.

A computer implementing the systems and methods described herein may overcome these technical deficiencies. For example, the computer may execute an application programming interface (API) to communicate with a client device. The client device may transmit an indication to the computer indicating the start of a game session, in some cases with one or more characteristics (e.g., age, age range, gender, or experience level) of the participants of the game session. The client device may generate and/or transmit values or statistics for different types of statistics or events that occur during the game session. For instance, for a basketball game session, the client device may transmit indications of points, rebounds, and assists by different individuals participating in the basketball game session to the computer. The computer may identify the characteristics associated with or corresponding to the individuals participating in the game session. The computer may determine or identify criteria (e.g., one or more rules and/or thresholds) that correspond to the characteristics of the individuals. The computer can determine which of the identified criteria is satisfied based on the statistics and/or values that the client device transmitted to the computer over the course of the game session. The computer can identify media segments (e.g., strings of sentences, strings of audio, video clips, etc.) that correspond with the satisfied criteria. The computer can generate a media content item for the game session using the identified media segments and the values or statistics that the client device transmitted to the computer.

The computer can generate a media content item for a game session responsive to determining an occurrence of a predetermined event. A predetermined event can be, for example, a defined time of a game session (e.g., an end of a quarter, half, or game), a defined value or sequence of values (e.g., an individual making three three-pointers in a row in basketball, a double play in baseball, a free kick goal in soccer, etc.), an input or request for a media content item from a client device or computing device, etc. When generating a media content item in response to determining the occurrence of the predetermined event, the computer can generate the media content items using the values or statistics that the computer has received for the game session since the start of the game session (e.g., all of the data the computer has stored with an association with an identification for the game session). The computer can generate the media content item based on the characteristics of the individuals participating in the game session. In this way, the computer can generate custom media content items for game sessions that are relevant to the participants.

Referring now to FIG. 1, a block diagram of a system 100 for automatic media generation for game sessions is shown, according to some implementations. The system 100 may include an automatic media generator 102 and a client device 104, in some embodiments. The client device 104 may communicate with the automatic media generator 102 over a network. The client device 104 may transmit indications of the beginning of game sessions, characteristics of the participants, and/or values or statistics for events of the game sessions (e.g., inputs from a client device that include data for something that occurred in a game session or the occurrences themselves) to the automatic media generator 102. The automatic media generator 102 can generate records (e.g., data structures dedicated to the individual game sessions, such as a file, document, table, listing, message, notification, etc.) and store the data corresponding to the events that the automatic media generator 102 receives for the game sessions in the records. The automatic media generator 102 can also store characteristics of the individuals participating in the game session in the records for the respective game sessions. The automatic media generator 102 can generate media content item or content items (e.g., game summaries or descriptions, video clips, audio clips, etc.) that are customized for the individual game sessions based on the characteristics of the participants. The automatic media generator 102 can do so using the data for the respective game sessions. The automatic media generator 102 can transmit the media content items to client devices (e.g., the client device 104) for display or execution (e.g., execute a video file or file to play the video or audio). The automatic media generator 102 can transmit media content items to the same client devices that transmit the data to generate the media content items or to different client devices.

The client device 104 may be or include any type and/or form of media device or computing device, including a desktop computer, laptop computer, portable computer, tablet computer, wearable computer, embedded computer, smart television, set top box, console, Internet of Things (IoT) device or smart appliance, or any other type and form of computing device. Computing device(s) may be referred to variously as a client, device, client device, computing device, anonymized computing device or any other such term. In some cases, the client device 104 can be recording hardware that is not a personal mobile device. Computing devices and intermediary modulators may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks. In many implementations, the networks may include a plurality of subnetworks which may be of the same or different types, and may include a plurality of additional devices (not illustrated), including gateways, modems, firewalls, routers, switches, etc.

The client device 104 be accessed by an user 106. The user 106 may be a person watching a game session 108. The game session 108 may be, for example, a game for a sport, such as basketball, soccer, football, etc., or any other type of game session. At the beginning of the game session 108, the user 106 may input (e.g., via a user interface) an indication of the beginning of the game session 108 to the client device 104. In some embodiments, in addition to the input indication, the user 106 can input values or identifications of characteristics (e.g., age, age range, gender, experience level, etc.) of the individuals (e.g., players) participating in the game session 108, and/or the type of game (e.g., basketball, soccer, tennis, football, chess, backgammon, or any other activity or game session) of the game session 108. The client device 104 can receive the input and transmit the input to the automatic media generator 102.

The automatic media generator 102 may include a processing circuit 110, a processor 112, and a memory 114. The processing circuit 110, the processor 112, and/or the memory 114 can correspond to or be the same as components described with reference to FIGS. 7A and 7B. In some embodiments, the automatic media generator 102 can operate in the cloud as one or more cloud servers. The automatic media generator 102 can communicate with the client device 104 and other client devices or computing devices over a network (e.g., a synchronous or asynchronous network).

The memory 114 may include a communicator 116, a session generator 118, an event identifier 120, a criteria selector 122, a segment selector 126, a content item generator 128, a game session database 130, a string database 132, and/or a template database 134. Memory 114 may include any number of components. Each of these components may operate to generate customized media content items for game sessions.

The communicator 116 can include instructions performed by one or more servers or processors (e.g., the processing circuit 110), in some embodiments. The communicator 116 may be or include an application programming interface (API) that facilitates communication between the automatic media generator 102 and other computing devices.

The communicator 116 can establish connections with computing devices (e.g., the client device 104). The communicator 116 can establish connections with the computing devices over a network. To do so, the communicator 116 can communicate with the computers across the network. In one example, the communicator 116 can transmit syn packets to the computers (or the computers can transmit syn packets to the communicator 116) and establish the connections using a TLS handshaking protocol. The communicator 116 can use any handshaking protocol to establish connections with the computers.

The client device 104 can transmit messages (e.g., indications of the beginning of the game session 108) to the automatic media generator 102 over the communication session the client device 104 established through the communicator 116. For example, the client device 104 can initiate the communication session with the communicator 116 when the client device 104 activates (e.g., responsive to a user input at the client device 104) an application executed by the client device 104. Upon execution, the client device 104 can transmit a message to the automatic media generator 102 to begin or establish a communication session. After establishing the communication session, the client device 104 can transmit messages to the automatic media generator 102, such as messages that indicate a beginning of the game session 108. At the beginning of the game session 108, the user 106 may input (e.g., via a user interface) an indication of the beginning of the game session 108 and/or characteristics (e.g., age, gender, age range, etc.) for the game session to the client device 104. Characteristics of individuals can be or include an experience level of the individuals. Experience levels can include one or more of (e.g., a combination of) a participation level of a plurality of participation levels of an organization (e.g., a club or organization may have different leagues dedicated to participants of different skill levels), an amount of time an individual has participated in game sessions of the type of game, a skill rating, a skill rating associated with a team, a skill rating associated with a league, a skill rating range associated with a team, a skill rating associated with a league, a number of game sessions an individual has participated in game sessions of the type of game, a type of an organization, or an identifier of an organization. Examples of experience levels and/or age ranges can include elementary, intermediate, club middle, high school, club high, or adult. The user 106 can input the type of game of the game session 108. The client device 104 can receive the input and transmit the input to the automatic media generator 102. The user 106 can be the same or different from individuals who are playing or participating in the game session 108.

The session generator 118 can include instructions performed by one or more servers or processors (e.g., the processing circuit 110), in some embodiments. The session generator 118 can be configured to generate records for game sessions. The records can be or include data structures (e.g., tables with field-value pairs that correspond with different types of data for the game sessions). The session generator 118 can generate identifications of game sessions (e.g., numeric or alphanumeric strings that individually identify the game sessions), such as by using a pseudo-random number generator or by sequentially generating the identifications based on the identifications of prior game sessions (e.g., incrementing a value of the most recently generated identification of a game session). In some cases, the identifications can already be stored in the memory 114 and the session generator 118 can retrieve the identifications from the memory 114. In response to receiving the indication of the beginning of the game session 108, the session generator 118 can generate an identification for the game session 108 and store the identification for the game session 108 in the record. The session generator 118 can store characteristics and/or a type of game of the game session 108 in the record. The session generator 118 can store the record in the memory 114, such as in the game session database 130.

The game session database 130 can be a graphical database or a relational database configured to store data for individual game sessions. The game session database 130 may store multiple records or data structures that each correspond to a different game session. In one example, the game session database 130 can store each record with an identification for the game session to which the record corresponds. The identifications for the game sessions can be used as keys in a look-up when querying the game session database 130 for data of individual game sessions or a location to insert received data of game sessions.

The records for game sessions can each include one or more field-value pairs (e.g., event field-value pairs). Each event field-value pair may include a field for an identification of an event (e.g., a number of points scored, an identification of a made basket, a steal, a rebound, a total number of rebounds, an individual rebound, a blocked shot, a total number of blocked shots, etc.). The event field-value pairs may be for specific players, for entire teams, or for individual plays. For example, an event field value pair may be for an individual player and indicate a total number of points the player has scored for a game. An event field-value pair may be for the team on which the player is playing and indicate the total number of points the team has scored. An event field-value pair may be for a single made basket and indicate the basket occurred. The field-value pairs may be updated or added to a record for a game session over time as the automatic media generator 102 receives identifications of events that occur over the course of the game session and generates new field-value pairs for the events or updates values in the currently stored field-value pairs of the record. The game session database 130 may store any number of records for game sessions and each record may include any number of event field-value pairs.

Upon generating the identification for the game session 108, the session generator 118 can transmit the identification for the game session 108 to the client device 104. The client device 104 can receive the identification for the game session 108 and store the identification for the game session 108 in memory. The client device 104 can include the identification for the game session 108 in messages that the client device 104 transmits to the automatic media generator 102 to indicate the game session 108 to which the message pertains.

As the user 106 watches the game session 108, the user 106 may input values or identifications of events that occur or occurred during the game sessions into the client device 104. For example, the game session 108 may be a basketball game between Team A and Team B. As players from Team A and Team B score points or otherwise perform other tasks in the basketball game (e.g., gather rebounds, record steals, generate assists, block shots, etc.), the user 106 can input values or identifications of the performed tasks as events. In the input for each event, the user 106 can include an identification of the player that performed the event, the team of the player that performed the event, the time of the event, and/or any other characteristics about the event (e.g., the number points the player scored with the made basket of the event). The client device 104 can record or store the input values in memory 114 (e.g., in a cache in memory 114). In some embodiments, certain identifications (e.g., times of the events, teams, or players) may be automatically generated based on an individual's input.

The client device 104 can transmit messages for the input events to the automatic media generator 102. For example, the client device 104 can receive values and/or identifications of an event from a user input (e.g., an input at an input/output device of the client device 104, such as a touch screen of the client device 104 or a mouse or keyboard connected with the client device 104). The client device 104 can generate a message in one or more data packets that include the received values and/or identifications in the payloads. The client device 104 can also include the identification for the game session 108 in one of the payloads of the data packets for the message. The client device 104 can transmit the message to the automatic media generator 102.

The event identifier 120 can include instructions performed by one or more servers or processors (e.g., the processing circuit 110), in some embodiments. The event identifier 120 can be configured to receive and store data for events of game sessions. The event identifier 120 can receive (e.g., via the communicator 116) messages that contain data of events from the client device 104. For example, the event identifier 120 can receive a message from the client device 104 that includes the identification for the game session 108 and one or more values or identifications of an event as input by the user 106. The event identifier 120 can receive the message and parse the message to identify or extract the identification for the game session 108 and the one or more values or identifications of the event from the message. The event identifier 120 can identify the record from the game session database 130 that corresponds to the game session 108 using the identification for the game session 108 in a look-up through the game session database 130. The event identifier 120 can identify the record in the game session database 130 that contains the identification for the game session 108 and store the data (e.g., the values or the identifications of the event) in the record.

In some cases, the event identifier 120 can store video clips or audio clips in the records for game sessions. For example, over the course of a game session (e.g., the game session 108), a recording device (e.g., the client device 104 or another computing device with a microphone and/or camera) can capture video and/or audio data of the game session. The recording device can transmit or stream the video and/or audio data to the automatic media generator 102 over time. The automatic media generator 102 can receive the video and/or audio data and store the video and/or audio data in the memory 114, such as in the record for the game session being recorded. The automatic media generator 102 can store the video and/or audio data as a file in the record. The automatic media generator 102 can store timestamps indicating the times of the beginning and/or the ending of the recording (e.g., the video and/or audio recording) of the game session.

The automatic media generator 102 can parse or segment video and/or audio data for a game session into clips of video and/or audio. The automatic media generator 102 can do so based on events for which a client device transmits messages containing data corresponding to the events to the automatic media generator 102. For example, the automatic media generator 102 can receive a video and/or audio recording or stream from a computing device (e.g., the client device 104 or another computing device) recording the game session 108. The automatic media generator 102 can also receive messages from the client device 104 that include data for events that occur in the game session. Each message that the automatic media generator 102 receives can include correspond to a timestamp (e.g., a timestamp indicating the time automatic media generator 102 receives the message, a timestamp indicating the time the client device 104 transmitted the message to the automatic media generator 102 as metadata in the message, and/or a timestamp input by the user 106 that caused the client device 104 to transmit the message). The automatic media generator 102 can store the timestamp that corresponds to the event in the record for the game session 108 to have a stored association with the event (e.g., data for the event).

The automatic media generator 102 can identify a portion or segment (e.g., a portion or segment of a defined length) of the video and/or audio recording of the game session that corresponds with the timestamp of the event. The automatic media generator 102 can do so by identifying a time of the video and/or audio recording of the game session 108 that corresponds with the timestamp of the event. The automatic media generator 102 can identify the time of the video and/or audio recording of the game session 108 that corresponds with the timestamp of the event by determining the time based on the beginning or end time of the recording (e.g., identifying the time of the event from the recording by identifying the end time of the recording and the timestamp of the event and identifying the instance in the event that corresponds with the difference between the end time and the time of the event) or by identifying a timestamp of a recording that corresponds or is within a defined range of the timestamp of the event. The automatic media generator 102 can identify the instant of the recording that corresponds with the timestamp of the event and capture or generate a segment (e.g., a segment having a defined length) of the video and/or audio data that includes the instant of the time stamp at the beginning, the end, the middle, or another defined portion of the segment of the video and/or audio data. The automatic media generator 102 can parse out or otherwise extract the video and/or audio data as a media segment. The automatic media generator 102 can store the extracted media segment in the memory 114, such as in the record of the game session 108.

The automatic media generator 102 can store the extracted media segment with an association with the event that corresponds with the segment (e.g., the event for which the media segment was generated). In some embodiments, the automatic media generator 102 can label or include as metadata with the media segment an identification of the event (e.g., the event field-value pair for the event) for which the media segment was generated. The automatic media generator 102 can generate and/or store media segments for events in this way for any number of events of game sessions.

The event identifier 120 can update records for game sessions using received data that correspond to events of the game sessions. For example, the event identifier 120 can identify the record that corresponds to the game session 108 based on the identification for the game session 108 in the record. The event identifier 120 can identify the event field-value pair or pairs in the record that correspond to the value or values of the event. The event identifier 120 can update or insert the received value or identification for the event in the identified event field-value pair or pairs. For example, an event field-value pair may correspond to a number of points player A has scored over the course of the game session 108 and an event field-value pair may correspond to a total number of three pointers player A has scored over the course of the game session 108. The event identifier 120 may identify data of an event that indicates player A scored three points through a three pointer. Responsive to identifying the data, the event identifier 120 can increment the event field-value pair (e.g., a value of the event field-value pair) for the total number of points player A has scored by three and increment the field-value pair indicating the total number of three pointers player A has scored by one. In some cases, the event identifier 120 can similarly increment corresponding field-value pairs for the team on which player A is playing. The event identifier 120 can also update event field-value pairs for events that indicate the end of a defined time period. For instance, responsive to receiving an indication of a defined time period (e.g., a quarter, half, period, inning, defined inning (e.g., seventh inning), game, etc.), the event identifier 120 can update an event field-value pair that corresponds to the time period by inserting a value (e.g., a binary value, such as one) that indicates the end of the defined time period. The event identifier 120 can similarly update the record for the game session 108 using data the event identifier 120 receives for the game session 108 from the client device 104. The event identifier 120 can similarly update any number of field-value pairs for the game session 108 any number of times.

In some cases, the event identifier 120 can generate new event field-value pairs in the record from data the event identifier 120 receives for game sessions. For example, the event identifier 120 can generate event field-value pairs that correspond to individual events. One example is a "play-by-play" sequence that keeps track of events as the events occur over the course of a game session. For instance, the event identifier 120 can generate a field-value pair in the record for the game session 108 that indicates player A made a three pointer. Another example of such events is an event that indicates an ending or a beginning of a defined period. For instance, the event identifier 120 can receive an indication of an end of a quarter, half, game, or other period of the game session 108. Responsive to receiving the indication, the event identifier 120 can generate a new field-value pair with a binary value (e.g., one) that indicates the end of the defined period. The event identifier 120 can generate event field-value pairs for any type or number of events.

In some cases, the event identifier 120 can include metadata regarding events (which may be included in the message that client device 104 transmitted to the automatic media generator 102 for the event) in the records for game sessions. Metadata may include, for example, an indication of the time in which the event occurred, the score of the game session after the event occurred, etc. Users, such as the user 106, can input values or identifications of metadata for events with the values or identifications for the events. Client devices, such as the client device 104, can include the metadata in the messages that the client devices transmit to the automatic media generator 102. The event identifier 120 can insert the metadata in the records for the game sessions as metadata for the particular events (e.g., in separate fields that correspond to (e.g., are in the same rows as) the event field-value pairs and/or in separate records).

The criteria selector 122 can include instructions performed by one or more servers or processors (e.g., the processing circuit 110), in some embodiments. The criteria selector 122 can be configured to determine or select criteria (e.g., a set of criteria) to use to generate media segments (e.g., a set of media segments) for media content items of portions of game sessions. The criteria selector 122 can be configured to determine or select criteria based on characteristics of the participants. For example, different criteria can be stored in the string database 132. Each criterion of the criteria can have a stored association within the string database 132 with one or more characteristics of individuals. The criteria selector 122 can identify the characteristics of a game session (e.g., the game session 108) from the record for the game session in the game session database 130. The criteria selector 122 can compare the characteristics to one or more of the criteria in the string database 132. Based on the comparison, the criteria selector 122 can identify the criteria that have a stored association with characteristics that match or that are identical to the characteristics of individuals for the game session in the record. The criteria selector 122 can identify, select, or determine to use the identified criteria to use to generate media content items for all or portions of individual game sessions. The criteria selector 122 may determine or select the criteria without identifying the identities of individuals, but rather select the criteria based on anonymized characteristics of individually or in the aggregate, such as the age range of the individuals without knowing the identities of the individuals.

For example, a criterion can correspond to (e.g., have a stored association in the string database 132 with) the characteristics of 17 years old and a male gender. The criteria selector 122 can determine whether to select the criterion by retrieving the age characteristic of a game session and a gender characteristic of the game session from the record for the game session. The criteria selector 122 can compare the retrieved age characteristic and gender characteristic for the game session to the stored characteristics for the criterion. Responsive to determining the age characteristic and gender characteristic match the characteristic for the criterion, the criteria selector 122 can determine to select or identify the criterion. Different criteria can correspond to different and/or a varying number of characteristics. The criteria selector 122 can select any number of criteria in this manner to use to generate media content items for game sessions.

In some embodiments, criteria can correspond to types of games. For example, criteria can be stored in the string database 132 with stored associations with different types of games. In some cases, each type of game can have a dedicated table with different criteria. The criteria selector 122 can identify the type of game of the game session from the record for the game session and determine which criteria to select based on the criteria having a stored association with the type of game of the game session.

In some cases, criteria can be adjustable or configured to be determined based on characteristics of individuals participating in a game session (e.g., participants). For example, the criteria selector 122 can determine a threshold for a category (e.g., an event category). The category may be an event or a type of event, such as points scored, number of rebounds, assists scored, etc. The criteria selector 122 can determine the threshold for a game session based on the characteristics of the participants of the game session. For instance, the string database 132 can store a table for the category. The table can indicate different values for the threshold for different sets or variations of characteristics of individuals participants in game sessions. The criteria selector 122 can determine the threshold by comparing the characteristics of the participants in the game session with the table and identifying the value for the threshold based on the comparison.

In another example, the criteria selector 122 can determine a threshold of a category of a criterion based on the data of game sessions that were completed prior to the game session for which the criteria selector 122 is determining the threshold. For example, the criteria selector 122 can identify one or more of the characteristics of the game session from the record for the game session in the game session database 130. The criteria selector 122 can query the game session database 130 using the one or more characteristics in a look-up to identify records that have matching characteristics to the characteristics of the game session. Based on the query, the criteria selector 122 can identify multiple records for game sessions with matching characteristics. The criteria selector 122 can identify a defined or predetermined number of the identified game sessions, in some cases by identifying the records for game sessions that occurred most recently compared to the game session (e.g., identify the defined or predetermined number of records that contain the latest timestamps). The criteria selector 122 can identify the records for the game sessions that occurred most recently compared to the game session and retrieve the data (e.g., values) for the category from the identified records.

The criteria selector 122 can determine the threshold based on the retrieved data for the category from the identified records. For example, the criteria selector 122 can perform a function on the retrieved values for the category, such as by aggregating, determining a median, determining an average, aggregating and determining a percentage of, etc., the retrieved values. The output of the function can be the threshold for the category.

For example, the criteria selector 122 can determine a threshold for points scored by a team for a game session played by individuals of 19 years of age. To do so, the criteria selector 122 can identify a defined or predetermined number of records from the game session database 130 for game sessions played by individuals of 19 years of age. The criteria selector 122 can retrieve the points scored by each team from the identified records. The criteria selector 122 can perform a function on the retrieved points to calculate the threshold.

In one example, the criteria selector 122 can calculate a threshold for a category by using a distribution. For instance, the criteria selector 122 can generate a distribution of values that the criteria selector 122 retrieved for a category. From the distribution, the criteria selector 122 can identify a value that corresponds to a defined or predetermined percentile (e.g., 70%) of the distribution. The identified value can be the threshold for the category.

In some embodiments, the criteria selector 122 can determine a threshold based on a user input. For example, the criteria selector 122 can receive an input threshold value and an identification of a category of data from the client device 104. In response to receiving the input threshold, the criteria selector 122 can identify a criterion in the string database 132 that corresponds to a threshold for a category of data. The criteria selector 122 store a value for the threshold to be input threshold value received from the client device 104. The input threshold value can be used to generate a media content item for the game session 108, but may not, in some cases, be used to generate a media content item for a different game session. In some embodiments, the criteria selector 122 can store an identification of the client device 104 with the threshold value. In such embodiments, the criteria selector 122 can use the threshold to generate future media content items for the client device 104.

The string database 132 can be a graph or relational database that is configured to store strings of text or other segments of media. Strings of text can each be or include a string of characters. Strings of characters can each form a sentence (e.g., have the syntax of a sentence, such as a subject and a verb). In some cases, one or more of the strings can include blank or populatable portions that are configured to be updated with data from a game session. For example, a string may include a form of "[Player Name] scored [Number of Points] during the game today." In the example string, the brackets may indicate portions of the string that can be updated with values from a game session. In this example, the populatable form [Player Name] can be replaced with a player's name and the populatable form [Number of Points] can be replaced with the number of points the player scored during the game session. Different strings can correspond with different populatable portions for different types of data and/or any number of populatable portions.

In some embodiments, different strings can correspond with (e.g., have a stored association with) different criteria within the string database 132. For example, the string database 132 can store a number of media segments with different variations of populatable portions. The different strings can correspond with different criteria (e.g., the criteria as described above). The criteria can indicate whether to use the strings corresponding to the criteria when generating a media content item (e.g., a text summary) for a game session (e.g., at least a portion of the game session). Upon determining a criterion is satisfied based on data of a game session (e.g., the game session 108), the automatic media generator 102 (e.g., via the segment selector 126) can identify the string that has a stored association with the satisfied criterion to use to generate a media content item for the game session.

In some embodiments, strings can be stored in the string database 132 with associations with different categories. Examples of such categories can include, but are not limited to, a game session summary category, a sequence category, and a team summary category. Strings in the game session summary category can be or include a description of the main thrust of what happened over the course of a game session. Strings in the sequence category can indicate the general contours of what happened over the course of a game session, such as different runs that occurred, halftime scores, etc. The strings that correspond with the team summary category (or any other category) can correspond with thresholds determined based on characteristics of participants of game sessions, as described herein.

The segment selector 126 can include instructions performed by one or more servers or processors (e.g., the processing circuit 110), in some embodiments. The segment selector 126 can be configured to generate strings of text for a media content item for the game session 108 (e.g., at least a portion of the game session). The segment selector 126 can retrieve data from the record for the game session 108. The segment selector 126 can compare the retrieved data with the criteria in the string database 132. Based on the comparison, the segment selector 126 can identify or determine criteria from the string database 132 that is satisfied. The segment selector 126 can generate the strings by identifying the strings that have stored associations with the satisfied criteria in the string database 132.

In one example, the segment selector 126 can determine a criterion is satisfied response to determining a threshold (e.g., a threshold calculated based on the characteristics of individuals participating in the game session 108) is satisfied. For instance, the criteria selector 124 can calculate or determine a threshold for a category of a number of points scored by an individual player. The segment selector 126 can retrieve (e.g., from event field-value pairs that correspond to total number of points in the record for the game session 108) the points scored by each individual player of the game session. The segment selector 126 can compare the retrieved total number of points for each player to the threshold. Responsive to determining one of the total number of points exceeds or otherwise satisfies the threshold, the segment selector 126 can determine the criterion is satisfied.

In another example, the segment selector 126 can determine a criterion is satisfied based on an identification of an event. For example, the segment selector 126 can determine a player a game winning basket of a basketball game of the game session 108 by retrieving a value from a field value pair that indicates a player scored a game winning basket. In some cases, the segment selector 126 can make such a determination by retrieving the final score, an identification of the last scored basket (e.g., the last event prior to the ending) of the game session 108, and a timestamp of the event. The segment selector 126 can compare the score, the identification, and the timestamp to a criterion that is satisfied if a player scores a basket within the last second (or another defined time period) and wins by the points associated with the basket or less.

In one example, the segment selector 126 can identify a satisfied criterion based on a sequence of events. For example, the segment selector 126 can identify event field-value pairs that correspond with individual events. The segment selector 126 can compare values from the field-value pairs with a criterion that corresponds with a single team that scored a number of baskets or a number of points in a row without the other team scoring or scoring a number of points or a number of baskets below another threshold. The segment selector 126 can compare the values of sequential events (e.g., which the segment selector 126 may determine based on sequential timestamps associated with the events) with the criterion to determine if the criterion is satisfied.

In some embodiments, the segment selector 126 can generate one or more strings (e.g., strings of text) by populating one or more media segments that correspond with satisfied criteria with values. The segment selector 126 can identify text springs with populatable portions. The segment selector 126 can identify the type of data that corresponds with the populatable portions. Examples of such types of data include, but are not limited to, name, number of points, number of rebounds, defined time period, a portion of defined time period (e.g., beginning or end of a quarter, half, inning, match, or game, etc.), etc. The segment selector 126 can retrieve the values from the record of the types of data for the populatable portions. The segment selector 126 can insert the retrieved values into the respective populatable portions of a string to generate the string. The segment selector 126 can generate any number of strings with any number of populatable portions in this manner.

In some embodiments, the string database 132 can store multiple variations (e.g., variations in wording or syntax) for individual strings. Each variation of a media segment can correspond to the same criterion. In some cases, each variation can include the same populatable portions (e.g., populatable portions for the same type of data). The segment selector 126 can select (e.g., pseudo-randomly select or select based on one or more rules, such as in sequence) one of the variations of the strings upon determining the criterion for the media segment is satisfied. The segment selector 126 can select different variations over time to reduce the repetitiveness of potentially using the same media segment in each media content item that the automatic media generator 102 generates.

In some embodiments, the string database 132 can store media segments that include indicators that individual words within the strings can be replaced by synonyms or other words. For example, a string can include the word "defeated" with a "-" symbol in front of the word. The string database 132 can store one or more synonyms or other replacement words for the word defeated, such as "bested," "topped," or "overcame." When the segment selector 126 processes the strings, the segment selector 126 can identify the - symbol in front of the defeated word and determine that the defeated word can be replaced with another word. In response to the determination, the segment selector 126 can identify the list of words in memory that correspond with defeated and select (e.g., pseudo-randomly select or select based on one or more rules, such as in sequence) a word from the list. In some cases, the word itself can be included in the list, thus keeping open the possibility of selecting the same word that appears in the original string. Strings can include any number of such replaceable words and the string database 132 can include any number of media segments with replaceable words. The replaceable words can increase variability between text summaries as the same string can be said in different ways.

The segment selector 126 can select media segments video and/or audio segments based on satisfied criteria. For example, the segment selector 126 can identify which criteria of the set of criteria identified by the criteria selector 122 are satisfied. Responsive to identifying the satisfied criteria, the segment selector 126 can identify any audio and/or video clips that are associated with the satisfied criteria. The segment selector 126 can do so by identifying the events from the record that correspond with the data that used to determine the criteria is satisfied. The segment selector 126 can identify the audio and/or video segments that were generated for the events from the memory 114. The segment selector 126 can tag the identified audio and/or video segments with an indication that the audio and/or video segments are associated with satisfied criteria.

The content item generator 128 can include instructions performed by one or more servers or processors (e.g., the processing circuit 110), in some embodiments. The content item generator 128 can be configured to generate media content items for game sessions (e.g., portions of game sessions). The content item generator 128 can generate the media content items based on the media segments that are generated by the segment selector 126. For example, the content item generator 128 can identify the media segments that the segment selector 126 generates. The content item generator 128 can concatenate, append, merge, stitch, join, or otherwise group all or a portion of the media segments together to form a media content item from the media segments.

Upon generating a media content item for the game session 108, the content item generator 128 can transmit the media content item to a client device, such as the client device 104 or another client device. The client device to which the content item generator 128 transmitted the media content item can receive the media content item. The client device can display the media content item on a display. Accordingly, in embodiments in which the automatic media generator 102 generates text summaries, the client device can display a summary of the game session 108 as generated by the automatic media generator 102 using natural language processing.

In some embodiments, the content item generator 128 only uses a portion (e.g., not all) of the media segments generated by the segment selector 126 or that correspond with satisfied criteria to generate text summaries. In such embodiments, the content item generator 128 can be configured to generate media content items with a defined or predetermined number of media segments. The content item generator 128 can be configured to select which media segments to use based on priority values that correspond with the media segments. For example, different strings or other media segments can be stored with priority values in the string database 132. The priority values can be values within a defined range (e.g., 1-10, 1-100, 0.0-1.0, etc.). The priority values can be predetermined (e.g., configured by an administrator). The content item generator 128 can identify the priority values of the strings or other media segments generated by the segment selector 126. The content item generator 128 can compare the priority values with each other. The content item generator 128 can identify the defined or predetermined number of media segments (e.g., a subset of media segments) with the highest priority (e.g., highest priority relative to the priority of other media segments). The content item generator 128 can generate the media content item for the game session with only the identified defined or predetermined number of media segments.

In some embodiments, the criteria stored in string database 132 can correspond with priority values. In such embodiments, the content item generator 128 can select which media segments to include in a media content item by identifying the priority of criteria that was used to select or identify the media segments. The content item generator 128 can identify a defined number or predetermined number of criteria that correspond with the highest priority criteria similar to above and identify the media segments that correspond with the satisfied criteria. In cases in which satisfied criteria corresponds to multiple media segments, the content item generator 128 can identify a defined or predetermined number of media segments of the satisfied criteria that corresponds to the highest priority.

In some embodiments, the content item generator 128 can select which media segments to use to generate a media content item according to a template. For example, the template database 134 can be a graph or relational database that is configured to store templates that each indicate different categories and/or orders of media segments to include in a media content item for a game session. One example of a template can include a rule (e.g., a first rule) that indicates a defined number (e.g., two) of media segments of the game summary category can be used in the media content item, a rule (e.g., a second rule) that indicates that any number of media segments of the sequence category can be used in the media content item, and/or a rule (e.g., a third rule) that indicates that any number of media segments in the team summary category can be used in the media content item. The content item generator 128 can select the defined number of media segments with the highest priority values of the categories to generate the media content items. Each template database 134 can include a different number of categories and/or a different number of media segments for each category. The content item generator 128 can select (e.g., randomly or pseudo-randomly select) templates for each media content item that the content item generator 128 generates to provide variation in the text summaries that the content item generator 128 generates.

In some embodiments, the content item generator 128 can generate media content items in response to determining a predetermined event occurred. Predetermined events may be or include triggers for the content item generator 128 to generate media content items for game sessions. Predetermined events can, for example, correspond to a specific time of a game (e.g., an end of a game, quarter, half, period, etc.), or other events that may occur during a game session (e.g., a specific player scored 10 points in a row). The automatic media generator 102 (e.g., any component of the automatic media generator 102) can determine a predetermined event occurred in response to receiving an identification of the predetermined event from a client device (e.g., the client device 104). The automatic media generator 102 can determine a predetermined event occurred for a game session (e.g., the game session 108) and retrieve the data for the game session from the record for the game session. The criteria selector 122 can determine which criteria applies or corresponds to the game session based on characteristics of the individuals participating in the game session. The segment selector 126 can determine which of the determined criteria is satisfied based on the data that corresponds with events of the game session and identify the media segments that correspond with the satisfied criteria. In cases in which the media segments are text strings, the segment selector 126 can populate portions of the identified text strings with data that has been stored and identified from the record for the game session up until the determination of the occurrence of the predetermined event. The content item generator 128 can generate a media content item with the media segments (e.g., the populated text strings and/or other media segments that the segment selector 126 has selected). Any part of the media content item generation process can be performed in response to the automatic media generator 102 determining the occurrence of a predetermined event. The content item generator 128 can generate a media content item at any point of a game session. Accordingly, the automatic media generator 102 can automatically generate media content items without any human input.

In a non-limiting example, the automatic media generator 102 can automatically generate a media content item for the game session 108 in response to determining the game session 108 has ended. For instance, through the communicator 116 and from the client device 104, the session generator 118 can receive an indication of a beginning of the game session 108 and characteristics of the individuals participating in the game session 108. In response to receiving the indication, the session generator 118 can generate an identification for the game session 108. The session generator 118 can store the identification for the game session 108 in a record and transmit the identification for the game session 108 to the client device 104. Over the course of the game session 108, the client device 104 can transmit, in messages, values or identifications of events that occurred over the course of the game session 108. The event identifier 120 can receive each message and store the data from the messages in the record for the game session 108. The event identifier 120 can do so based on the messages containing the identification for the game session 108 that matches the identification for the game session 108 in the record for the game session 108. The event identifier 120 can receive a message that includes an indication of an occurrence of a predetermined event (e.g., an ending of the game session)

The event identifier 120 can determine the occurrence of the predetermined event based on the indication of the occurrence of the predetermined event. The criteria selector 122 can determine the criteria for the game session 108 based on the characteristics of the game session 108, in some cases in response to the determining of the occurrence of the predetermined event. The segment selector 126 can determine which criteria are satisfied based on the data of the events of the game session 108, identify the media segments that correspond with the satisfied criteria, and, in the cases of strings, populate portions of the strings (e.g., the populatable portions of the strings) with data that corresponds with the events of the game session 108. The content item generator 128 can generate a media content item based on the populated strings and/or other media segments that the segment selector 126 identifies. The content item generator 128 can transmit, through the communicator 116, the media content item to the client device 104 for display.

Figure 2:
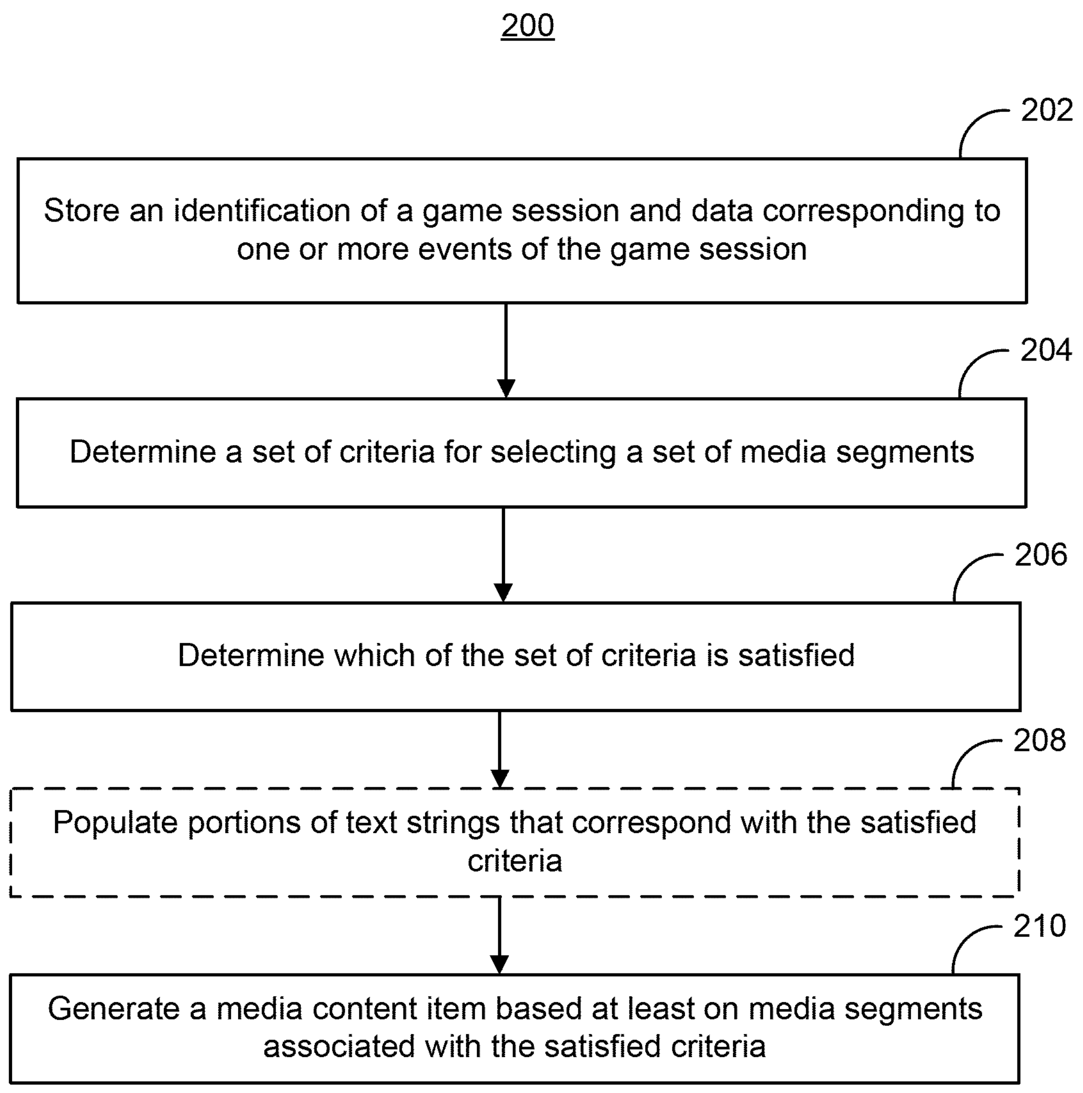
FIG. 2 is a flow chart of an implementation of a method for automatic media generation for game sessions, according to some implementations.

FIG. 2 is a flow chart of an implementation of a method 200 for automatic generation of media content items of game sessions, according to some implementations. The method 200 may be performed by individual devices within a natural language processing system. For example, the method 200 may be performed by a data processing system, such as the automatic media generator 102, shown and described with reference to FIG. 1. The method 200 may include any number of steps and the steps may be performed in any order. The data processing system may perform the method 200 to automatically generate media content items for game sessions. The data processing system may customize the media content items based on the characteristics of the participants, such as by varying the criteria that the data processing system uses to select media segments for the media content items based on the characteristics of the participants. Accordingly, the data processing system may offer a method of context-specific natural language processing or media generation to generate text summaries or other media content items that are more relevant to the situations that the text summaries or media content items depict.

At step 202, the data processing system may store an identification of a game session in memory. The data processing system can store the identification for the game session in memory in response to receiving an indication of the game session (e.g., indicating the beginning of the game session) from a client device. The data processing system can receive the indication for the game session from the client device and generate the identification for the game session. The data processing system can generate the identification for the game session by using a random number generation technique or sequentially based on an identification the data processing system generated for a previous game session (e.g., a game session of the same type, such as the same sport or activity). In some cases, the data processing system can also receive characteristics of individuals participating in the game session from the client device. The data processing system can store the identification for the game session and/or the characteristics in memory, such as in a record in a database. The data processing system can transmit the identification for the game session to the client device.

Over the course of the game session, the data processing system can receive messages from the client device. Each message can include the identification for the game session and data that corresponds to events that occurred during the game session (e.g., statistics for individual players participating in the game session, statistics for one or more of the teams participating in the game session, the occurrence of defined events of the game session (e.g., end of a defined time period), etc.).

The data processing system can receive each message. The data processing system can identify or extract the data from the messages and identify the identification for the game session from each message. For each message, the data processing system can compare the identification for the game session in the message with identifications for game sessions in memory. The data processing system can identify a record that includes a matching identification to the identification for the game session in the message. The data processing system can store the data that corresponds to events in the messages in the record that contains the matching identification for the game session.

At step 204, the data processing system can determine a set of criteria for generating a set of media segments. The data processing system can determine the set of criteria based on the characteristics of the individuals that are participating in the game session. For example, the data processing system can store criteria in a database in memory of the data processing system. Each criterion can correspond to (e.g., have a stored association with) one or more characteristics of participants of game sessions. The data processing system can identify the characteristics of individuals participating in the game session and compare the identified characteristics with the characteristics that correspond to the individual criteria. The data processing system can identify the criteria that correspond to one or more characteristics that match the characteristics of individuals participating in the game session. The identified characteristics can be included in the set of criteria.

In some embodiments, the data processing system can determine one or more criteria of the set of criteria by calculating the criteria. The data processing system can calculate a threshold for a category of data that corresponds to events of the game session. In one example, the data processing system can calculate the threshold by comparing the characteristics of the individuals participating in the game session to a table and identifying the value of the threshold for the category from the table. In another example, the data processing system can calculate the threshold by identifying records that correspond to the same characteristics as the characteristics of the game session, retrieving values for the category from the identified records, and performing a function on the retrieved values (e.g., an averaging function, a median function, calculating a percentile, etc.) from the retrieved values to calculate the threshold. The data processing system can calculate such thresholds for any number of categories. The data processing system can determine the set of criteria to have any combination of thresholds or other types of criteria based on the characteristics of the individuals participating in the game session.

Different criteria of the set of criteria can correspond with different media segments. For example, each criterion can have a stored association with a media segment in the database. One or more of such media segments (e.g., strings) can include portions that can be populated with values (e.g., names, words, and/or numerical values). Such media segments can be populated and/or used to generate media content items for game sessions.

At step 206, the data processing system can determine which of the set of criteria is satisfied. The data processing system can determine satisfied criteria from the set by comparing the data (e.g., values) that corresponds to events of the game session that is stored in the record for the game session to the criteria. Based on the comparison, the data processing system can identify which of the criteria is satisfied.

At step 208, the data processing system can populate the media segments that correspond with the satisfied criteria. The data processing system can populate portions (e.g., populatable portions) of the media segments (e.g., strings) with values that correspond to portions from the data in the record for the game session. For example, a media segment may include a populatable portion that corresponds to a name of an individual and a populatable portion that corresponds to an amount of points the named individual scored in the game session. The data processing system can retrieve a value of a name of a player and a value indicating the amount of points the player scored in the game session and populate the respective populatable portions in the media segment. The data processing system may similarly populate any number of media segments from the media segments that correspond with the satisfied criteria of the set of criteria.

At step 210, the data processing system can generate a media content item for the game session. The data processing system can generate the media content item based at least on the populated media segments and/or other media segments associated with satisfied criteria. For example, the data processing system can identify the populated media segments and/or any media segments without populatable portions that correspond to the satisfied criteria of the set of criteria. The data processing system can concatenate, merge, stitch, append, or otherwise join the populated media segments and/or any other media segments that are associated with satisfied criteria together to generate a media content item.

In some embodiments, the data processing system can generate the media content item for the game session in response to determining an occurrence of a predetermined event. A predetermined event can be, for example, an ending of a defined or predetermined time period (e.g., a quarter, a half, or an entire game) of a game session, or any other event. In some cases, the data processing system can determine the predetermined event occurred based on a sequence of events (e.g., determine the occurrence of the predetermined event responsive to identify multiple identifications in a row that correspond to a criterion that indicates, upon being satisfied, the predetermined event occurred). The data processing system can determine the occurrence of such a predetermined event responsive to identifying such an identification from a message that contains the identification for the game session. The data processing system can generate the media content item in response determining the occurrence of a predetermined event. The data processing system may perform any of the steps of the method 200 in response to determining the occurrence of the predetermined event.

Figure 3:
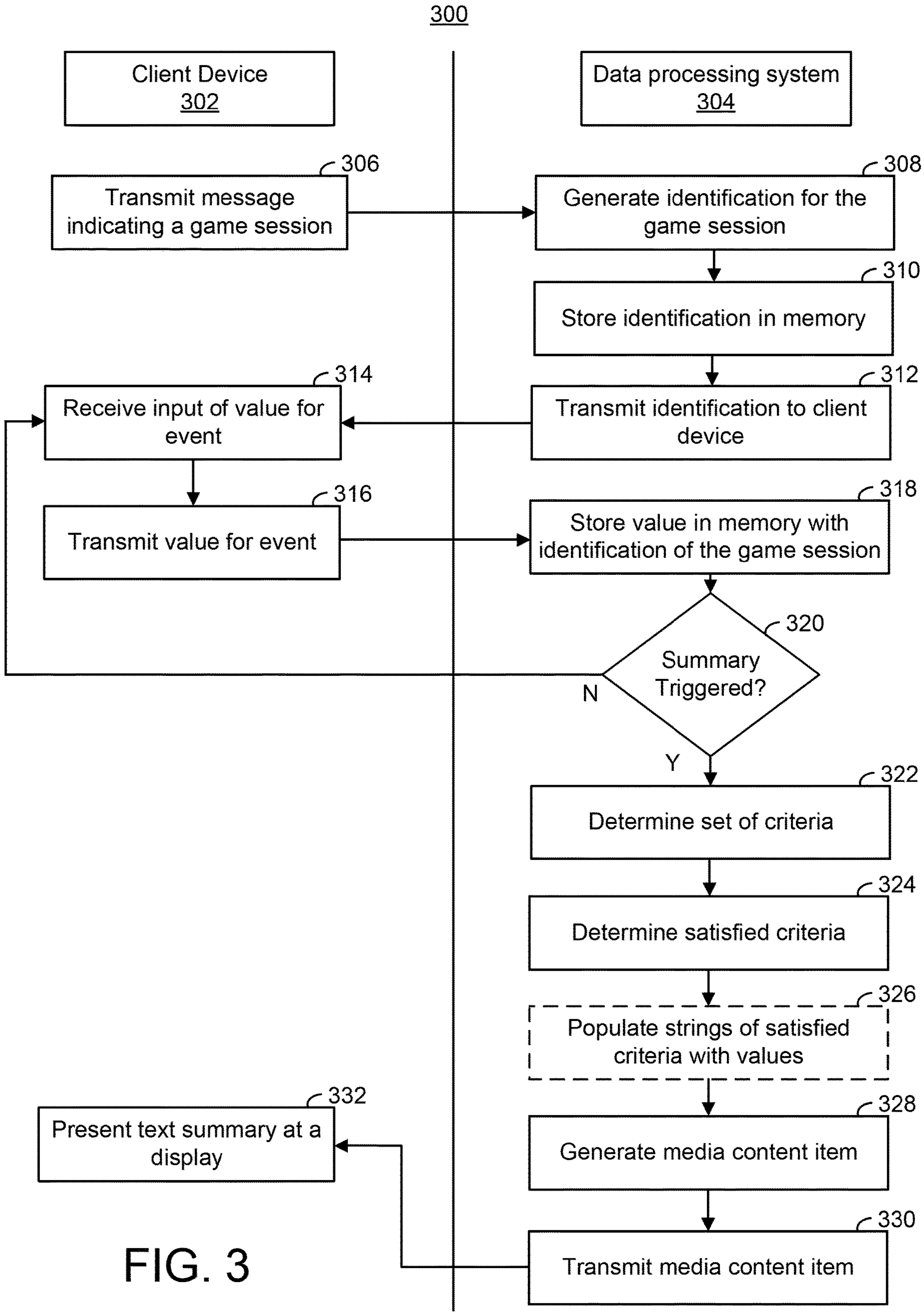
FIG. 3 is a flow chart of an implementation of a method for automatic media generation for game sessions, according to some implementations.

FIG. 3 is a flow chart of an implementation of a method 300 for automatic generation of media content items for game sessions, according to some implementations. The method 300 may be performed by individual devices within a natural language processing system or any other content generation system. For example, the method 200 may be performed by a client device 302 and a data processing system 304. The client device 302 and the data processing system 304 can be the same as or similar to the client device 104 and the automatic media generator 102, shown and described with reference to FIG. 1. The method 300 may include any number of steps and the steps may be performed in any order. The data processing system can perform the method 300 as a part of the method 200.

At step 306, the client device 302 can transmit a message to the data processing system 304. The message can indicate that a game session has begun or is starting. At step 308, the data processing system 304 can generate an identification for the game session. At step 310, the data processing system 304 can store the identification for the game session in memory. The data processing system 304 can store the identification for the game session in a record in memory. At step 312, the data processing system 304 can transmit the identification for the game session to the client device 302. The client device 302 can receive the identification for the game session and store the identification for the game session in memory. At step 314, the client device 302 can receive an input value for an event. The event may be an event that occurred within the game session. The input value may be an identification of the event and/or a statistic that corresponds to the event. At step 316, the client device 302 can transmit the input value for the event to the data processing system 304. The client device 302 can transmit the input value to the data processing system 304 in a message that contains the identification for the game session. At step 318, the data processing system 304 can store the value in memory. The data processing system 304 can store the value in the record that contains the same identification for the game session. At step 320, the data processing system 304 can determine whether a predetermined event occurred that corresponds to a media content item for the game session to be generated. The data processing system 304 can compare the received value for the event to values of one or more predetermined events that the data processing system 304 has stored in memory. Responsive to determining there is not a match, the method can return to the step 314. The client device 302 and the data processing system 304 can respectively perform the steps 314-320 until the data processing system 304 determines a predetermined event occurred.

Responsive to identifying a match between a value received from the client device 302 and a value that corresponds to a predetermined event (e.g., determining a predetermined occurred), at step 322, the data processing system 304 can determine a set of criteria. The data processing system 304 can determine the set of criteria based on characteristics of individuals participating in the game session. The data processing system 304 can identify such characteristics from the record for the game session (e.g., the data processing system 304 can receive the characteristics from the client device 302 and store the characteristics in the record) or directly from a message from the client device 302. In some cases, the data processing system 304 can identify the characteristics in the same message as the message that the data processing system 304 retrieved a value to determine the predetermined event. The data processing system 304 can determine or calculate a set of criteria based on the characteristics. Each criterion of the set of criteria can correspond to a media segment (e.g., a text string, video data, and/or audio data).

At step 324, the data processing system 304 can determine which of the set of criteria is satisfied. The data processing system 304 can retrieve values from the record for the game session and compare the retrieved values to the set of criteria. Based on the comparison, the data processing system 304 can identify or determine criteria that are satisfied. The data processing system 304 can identify the media segments that correspond with the satisfied criteria.

At step 326, in cases in which the media segments include one or more text strings, the data processing system 304 can populate one or more of the strings that correspond with the satisfied criteria. The data processing system 304 can identify strings of the media segments and identify the type of data that corresponds to the different populatable portions. The data processing system 304 can retrieve the identified type of data from the record for the game session and insert or otherwise populate the populatable portions with the corresponding retrieved data. At step 328, the data processing system 304 can generate a media content item. The data processing system 304 can generate the media content item based on the media segments that correspond to populated portions and/or any other media segments that correspond with satisfied criteria. The data processing system 304 can concatenate, append, merge, stitch, or join such media segments along to generate the media content item. At step 330, the data processing system 304 can transmit the media content item to the client device 302. At step 332, the client device 302 can present or display the media content item on a display of or user interface of the client device 302.

Figure 4:
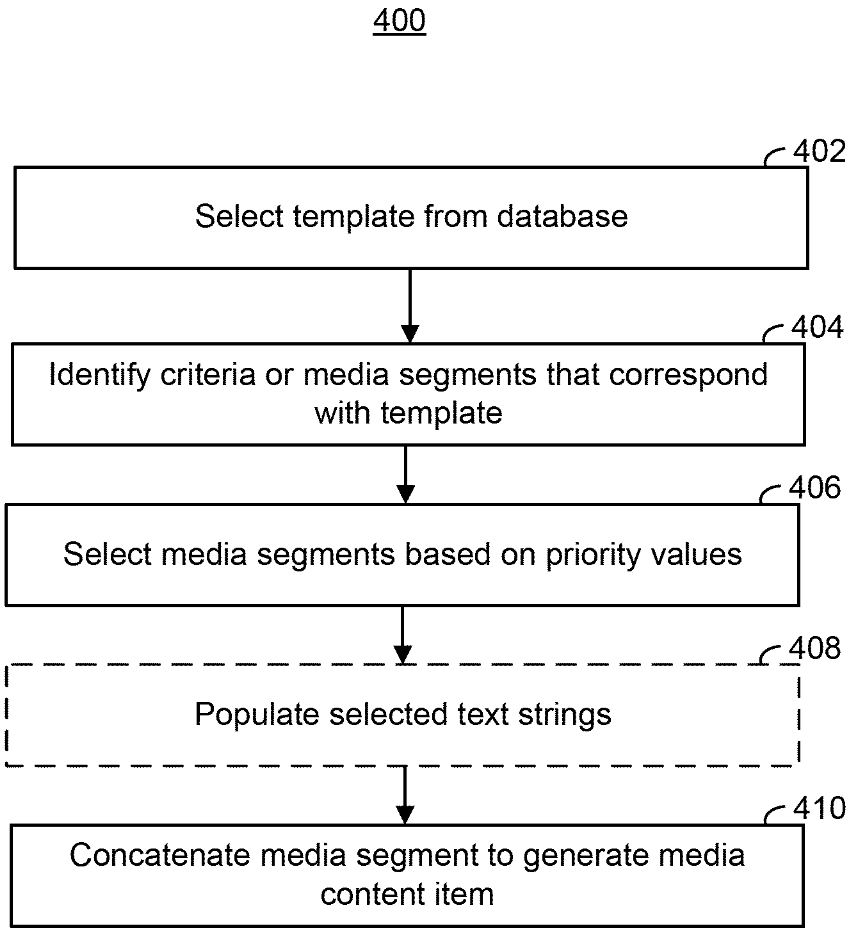
FIG. 4 is a flow chart of an implementation of a method for automatic media generation for game sessions, according to some implementations.

FIG. 4 is a flow chart of an implementation of a method 400 for automatic generation of media content items of game sessions, according to some implementations. The method 400 may be performed by individual devices within a natural language processing system or another media generation system. For example, the method 400 may be performed by a data processing system, such as the automatic media generator 102, shown and described with reference to FIG. 1. The method 400 may include any number of steps and the steps may be performed in any order. The data processing system may perform the method 400 to automatically generate media content items for game sessions. The data processing system may perform the method 400 as a part of one or more of the steps 204-210 of the method 200 or 320-328 of the method 300.

At step 402, the data processing system can select a template from a database. The database can include multiple templates. The data processing system can select the template to use to generate a media content item for a game session. The template can indicate an order of different categories of media segments to include in the media content item. The data processing system can select the template pseudo-randomly from the database. Accordingly, the data processing system may select different templates over time for variation between the media content items that the data processing system generates.

At step 404, the data processing system can identify criteria or media segments that correspond with the template. The data processing system can identify the criteria or media segments that correspond with the template based on identifications of categories that are stored with the criteria or the media segments. In some embodiments, the data processing system may only identify criteria or media segments that the data processing system has determined to be satisfied based on data that corresponds to events of the game session.

At step 406, the data processing system can select media segments based on priority values of the media segments or criteria. For example, each of the identified media segments can be stored with a priority value. The template can indicate a number of each category of media segments to include in the media content item. The data processing system can identify the number of media segments for each category that have the highest priority value of the identified media segments. For instance, the template can indicate to include two media segments of a first category of media segments, four media segments of a second category of media segments, and three media segments of a third category. The data processing system can identify and select the two media segments of the first category that have the highest priority value of media segments associated with the first category and associated with satisfied criteria, four media segments of the second category that have the highest priority value of media segments associated with the second category and associated with satisfied criteria, and three media segments of the third category that have the highest priority value of media segments associated with the third category and associated with satisfied criteria.

At step 408, in cases in which the media segments include strings, the data processing system can populate the selected media segments. The data processing system can populate portions of the media segments that can be populated with data or values of that correspond to events of the game session. The data processing system can determine or identify the types of data to include in the portions of the media segments. The data processing system can insert or populate the portions of the media segments with the respective types of data from the record for the game session.

At step 410, the data processing system can concatenate the media segments. The data processing system can concatenate or append the media segments that correspond to satisfied criteria and that were selected based on the selected template to generate the media content item. In some cases, the data processing system can concatenate, stitch, or append the populated media segments with other media segments that are not populatable but that the data processing system identified based on the template. The data processing system can concatenate the media segments in the order specified by the template.

Figure 5:
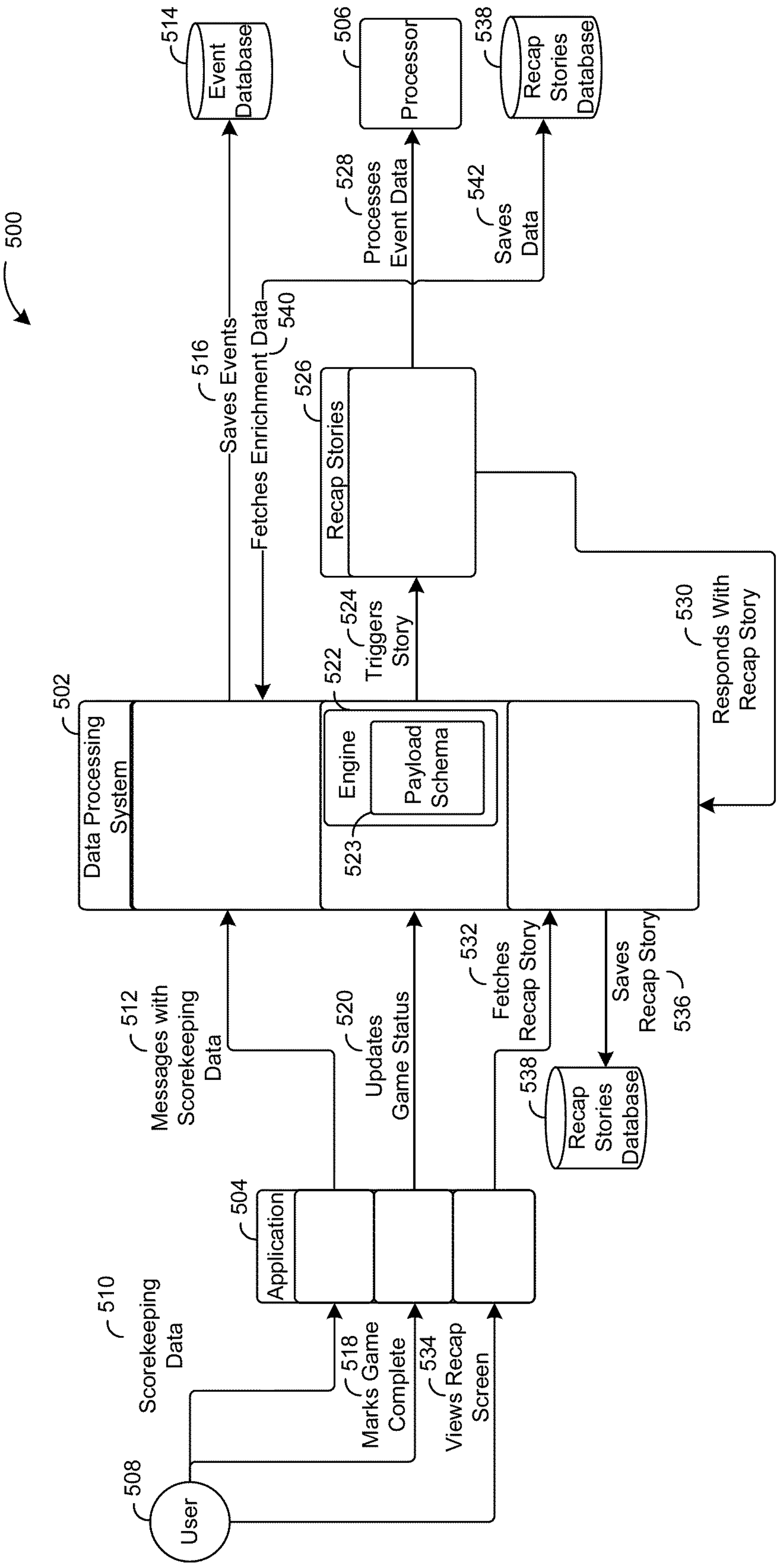
FIG. 5 is a block diagram of a system for automatic media generation for game sessions, according to some implementations.

FIG. 5 is a block diagram of a system 500 for automatic media content item generation for game sessions, according to some implementations. The system 500 can include a data processing system 502, an application 504, and a processor 506. The data processing system can be the same as or similar to the automatic media generator 102. The application 504 can be an application executed by a client device (e.g., the client device 104). The processor 506 can be a processor external to or a part of the data processing system 502. A user 508 can access the application 504 through an input/output device (e.g., a mouse, keyboard, and/or touchscreen) of or connected to the client device executing the application 504.

The user 508 can input scorekeeping data 510 into the application 504. The scorekeeping data 510 can be or include values or identifications of events that occur during or over the course of a game session. The application 504 can receive the scorekeeping data 510 and transmit the scorekeeping data 510 to the data processing system 502 in messages 512. The data processing system 502 can receive the messages and store the data in an event database 514 as individual events 516 that each correspond to a different message the data processing system 502 receives from the application 504.

The user 508 can provide an input 518 to the application 504 that marks the ending of the game session. Responsive to receiving the input 518, the application 504 can transmit an indication 520 of the input 518 to the data processing system 502. The indication 520 can update the status of the game session to be an ending of the game session. An engine 522 of the data processing system 502 can execute a payload schema 523 to trigger 524 generation of a story (e.g., a media content item) 526 of the game session. The processor 506 can process event data 528 of the game session using the natural language processing techniques and/or other processing techniques described herein to generate the story 526. The processor 506 can transmit 530 the story 526 to the data processing system 502. The application 504 can fetch 532 the story 526 and display the story 526 at a user interface of the client device executing the application 504. The data processing system 502 can save (e.g., store) 536 the story 526 in a recap stories database 538.

In some cases, subsequent to saving the story in the recap stories database 538, the data processing system can use the story to enrich 540 the data that the data processing system 502 uses to generate a subsequent story (e.g., a subsequent story for another game session by one of the same teams of the game session). The data processing system 502 can save 542 data that was used to generate the story 526 in the recap stories database 538 and later retrieve the data for the story 526 to use to generate a story for another game session. In doing so, the data processing system 502 may be able to identify stories regarding consecutive games such as a player that scores 20 points multiple games in a row or a winning streak of a team that spans multiple games.

FIG. 6 depicts an example text summary 600 generated by a system for media generation, according to some implementations. The text summary 600 can be generated by a data processing system (e.g., the automatic media generator 102). Each sentence of the text summary 600 can correspond to satisfied criteria for a game session.

B. Computing Environment

Having discussed specific embodiments of the present solution, it may be helpful to describe aspects of the operating environment as well as associated system components (e.g., hardware elements) in connection with the methods and systems described herein.

Figure 7A:
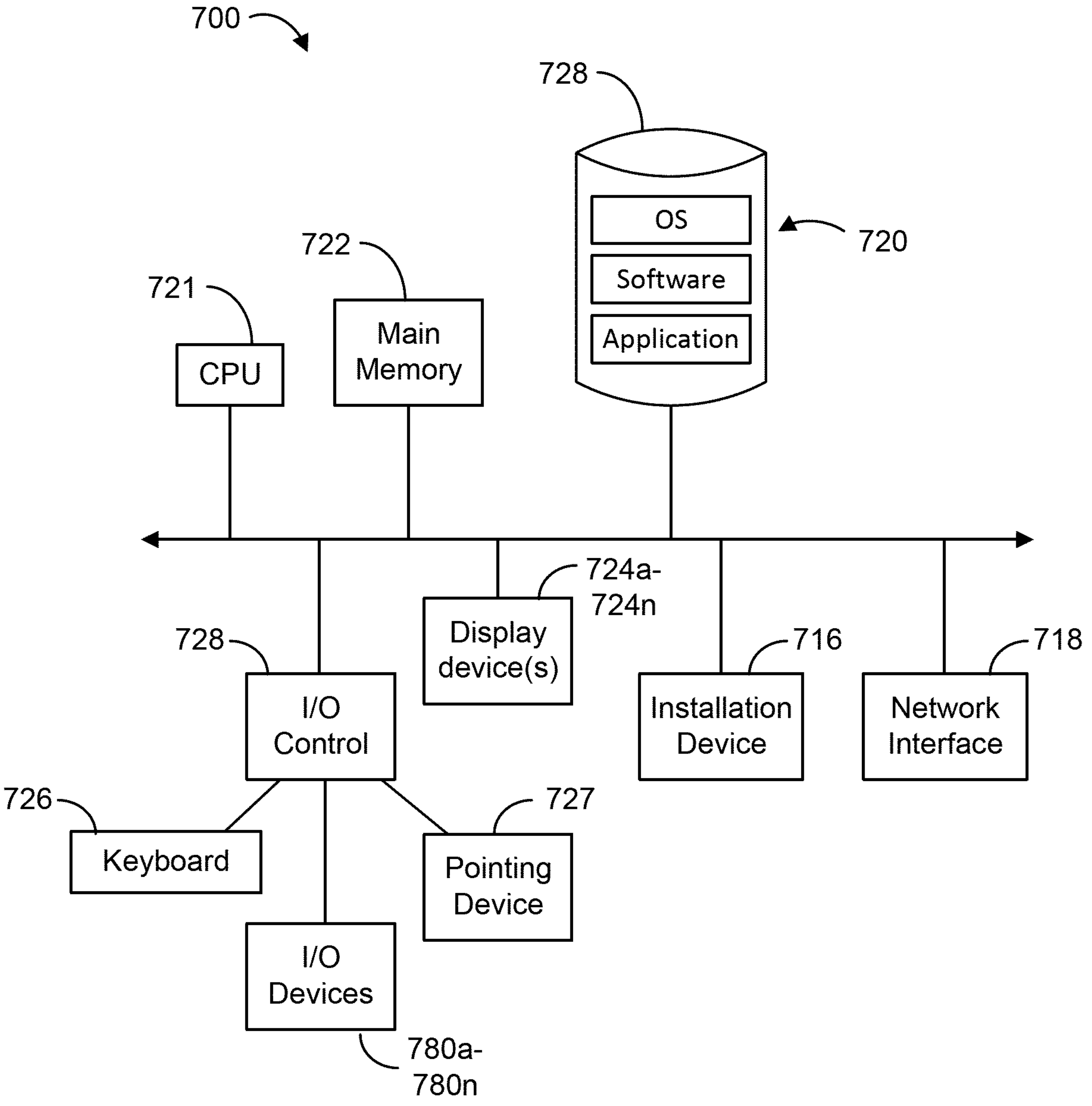
FIGS. 7A and 7B are block diagrams depicting embodiments of computing devices that can be used in connection with the methods and systems described herein.
Figure 7B:
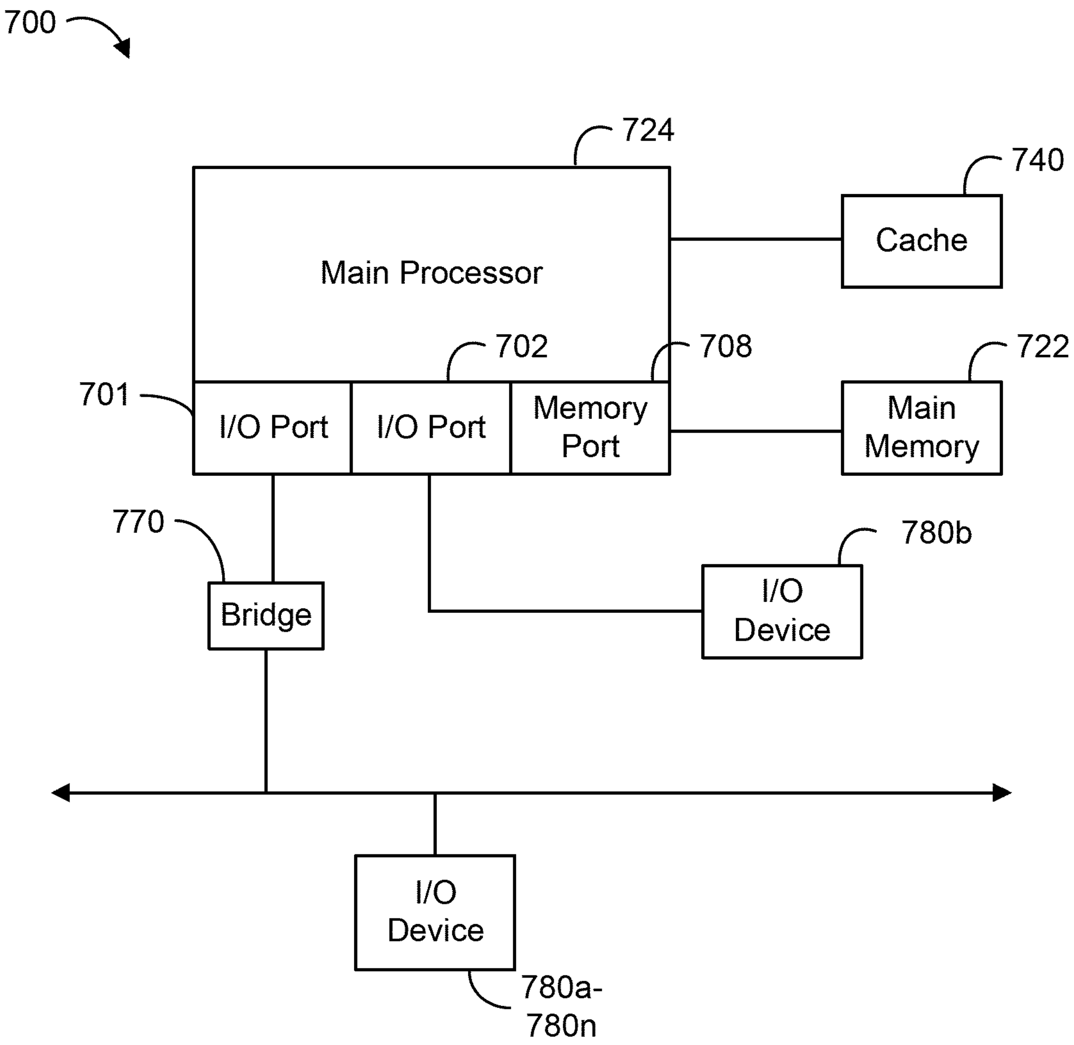

The systems discussed herein may be deployed as and/or executed on any type and form of computing device, such as a computer, network device or appliance capable of communicating on any type and form of network and performing the operations described herein. FIGS. 7A and 7B depict block diagrams of a computing device 700 useful for practicing an embodiment of the systems and methods described herein. As shown in FIGS. 7A and 7B, each computing device 700 includes a central processing unit 721, and a main memory unit 722. As shown in FIG. 7A, a computing device 700 may include a storage device 728, an installation device 716, a network interface 718, an I/O controller 723, display devices 724*a*-724*n*, a keyboard 726 and a pointing device 727, such as a mouse. The storage device 728 may include, without limitation, an operating system and/or software. As shown in FIG. 7B, each computing device 700 may also include additional optional elements, such as a memory port 703, a bridge 770, one or more input/output devices 730*a*-730*n* (generally referred to using reference numeral 730), and a cache memory 740 in communication with the central processing unit 721.

The central processing unit 721 is any logic circuitry that responds to and processes instructions fetched from the main memory unit 722. In many embodiments, the central processing unit 721 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 700 may be based on any of these processors, or any other processor capable of operating as described herein.

Main memory unit 722 may be one or more memory chips capable of storing data and allowing any storage location to be directly accessed by the microprocessor 721, such as any type or variant of Static random access memory (SRAM), Dynamic random access memory (DRAM), Ferroelectric RAM (FRAM), NAND Flash, NOR Flash and Solid State Drives (SSD). The main memory 722 may be based on any of the above described memory chips, or any other available memory chips capable of operating as described herein. In the embodiment shown in FIG. 7A, the processor 721 communicates with main memory 722 via a system bus 780 (described in more detail below). FIG. 7B depicts an embodiment of a computing device 700 in which the processor communicates directly with main memory 722 via a memory port 703. For example, in FIG. 7B the main memory 722 may be DRDRAM.

FIG. 7B depicts an embodiment in which the main processor 721 communicates directly with cache memory 740 via a secondary bus, sometimes referred to as a backside bus. In other embodiments, the main processor 721 communicates with cache memory 740 using the system bus 780. Cache memory 740 typically has a faster response time than main memory 722 and is provided by, for example, SRAM, BSRAM, or EDRAM. In the embodiment shown in FIG. 7B, the processor 721 communicates with various I/O devices 730 via a local system bus 780. Various buses may be used to connect the central processing unit 721 to any of the I/O devices 730, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 724, the processor 721 may use an Advanced Graphics Port (AGP) to communicate with the display 724. FIG. 7B depicts an embodiment of a computer 700 in which the main processor 721 may communicate directly with I/O device 730*b*, for example via HYPERTRANSPORT, RAPIDIO, or INFINIBAND communications technology. FIG. 7B also depicts an embodiment in which local busses and direct communication are mixed: the processor 721 communicates with I/O device 730*a* using a local interconnect bus while communicating with I/O device 730*b* directly.

A wide variety of I/O devices 730*a*-730*n* may be present in the computing device 700. Input devices include keyboards, mice, trackpads, trackballs, microphones, dials, touch pads, touch screens, and drawing tablets. Output devices include video displays, speakers, inkjet printers, laser printers, projectors and dye-sublimation printers. The I/O devices may be controlled by an I/O controller 723 as shown in FIG. 7A. The I/O controller may control one or more I/O devices such as a keyboard 726 and a pointing device 727, e.g., a mouse or optical pen. Furthermore, an I/O device may also provide storage and/or an installation device 716 for the computing device 700. In still other embodiments, the computing device 700 may provide USB connections (not shown) to receive handheld USB storage devices such as the USB Flash Drive line of devices manufactured by Twintech Industry, Inc., of Los Alamitos, California.

Referring again to FIG. 7A, the computing device 700 may support any suitable installation device 716, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 700 may further include a storage device, such as one or more hard disk drives or redundant arrays of independent disks, for storing an operating system and other related software, and for storing application software programs such as any program or software 720 for implementing (e.g., configured and/or designed for) the systems and methods described herein. Optionally, any of the installation devices 716 could also be used as the storage device. Additionally, the operating system and the software can be run from a bootable medium.

Furthermore, the computing device 700 may include a network interface 718 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 700 communicates with other computing devices 700' via any type and/or form of gateway or tunneling protocol such as Secure Socket Layer (SSL) or Transport Layer Security (TLS). The network interface 718 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

In some implementations, the computing device 700 may include or be connected to one or more display devices 724*a*-724*n*. As such, any of the I/O devices 730*a*-730*n* and/or the I/O controller 723 may include any type and/or form of suitable hardware, software, or combination of hardware and software to support, enable or provide for the connection and use of the display device(s) 724*a*-724*n* by the computing device 700. For example, the computing device 700 may include any type and/or form of video adapter, video card, driver, and/or library to interface, communicate, connect or otherwise use the display device(s) 724a-724n. In one embodiment, a video adapter may include multiple connectors to interface to the display device(s) 724a-724n. In other embodiments, the computing device 700 may include multiple video adapters, with each video adapter connected to the display device(s) 724a-724n. In some implementations, any portion of the operating system of the computing device 700 may be configured for using multiple displays 724a-724n. One ordinarily skilled in the art will recognize and appreciate the various ways and embodiments that a computing device 700 may be configured to have one or more display devices 724a-724n.

In further embodiments, an I/O device 730 may be a bridge between the system bus 780 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 700 of the sort depicted in FIGS. 7A and 7B may operate under the control of an operating system, which control scheduling of tasks and access to system resources. The computing device 700 can be running any operating system, such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 700 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 700 has sufficient processor power and memory capacity to perform the operations described herein.

In some implementations, the computing device 700 may have different processors, operating systems, and input devices consistent with the device. For example, in one embodiment, the computing device 700 is a smart phone, mobile device, tablet or personal digital assistant. In still other embodiments, the computing device 700 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 700 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. One or more non-transitory computer-readable media for automatic media generation for game sessions, the non-transitory computer readable media comprising instructions which, when executed by one or more processors, cause the one or more processors to:

store an identification of a game session and data corresponding to one or more events of the game session, the game session corresponding to one or more characteristics of individuals participating in the game session;

determine, based on the one or more characteristics of the individuals participating in the game session, a set of criteria for selecting a set of media segments at least by:

retrieving one or more values for a category from stored data corresponding to one or more events of one or more game sessions completed prior to the game session and corresponding to the one or more characteristics of individuals participating in the game session; and calculating a threshold for the category based on the retrieved one or more values, wherein different criteria of the set of criteria correspond to different media segments;

determine which of the set of criteria is satisfied based on the stored data corresponding to the one or more events of the game session at least by determining a value of the category in the data corresponding to the one or more events of the game session exceeds the threshold;

select one or more media segments based on the satisfied criteria; and responsive to determining an occurrence of a predetermined event, generate a media content item for at least a portion of the game session based on the selected one or more media segments.

2. The one or more non-transitory computer-readable media of claim 1, wherein execution of the instructions causes the one or more processors to calculate the threshold for the category by:

generating a distribution of the retrieved values for the category of the stored data corresponding to the one or more events of the one or more game sessions; and determining a threshold value at a defined percentile of the distribution to be the threshold.

3. The one or more non-transitory computer-readable media of claim 1, wherein the one or more characteristics comprise an age or an age range.

4. The one or more non-transitory computer-readable media of claim 1, wherein the one or more media segments that correspond with the satisfied criteria correspond to priority values; and wherein execution of the instructions causes the one or more processors to generate the media content item by:

selecting a subset of the one or more media segments based on the priority values of the one or more media segments; and generating the media content item from only the subset of the one or more media segments.

5. The one or more non-transitory computer-readable media of claim 1, wherein the one or more media segments each correspond to one of a plurality of categories, the plurality of categories comprising a game session summary category, a sequence category, and a team summary category.

6. The one or more non-transitory computer-readable media of claim 5, wherein execution of the instructions causes the one or more processors to:

store a first rule indicating only a defined number of media segments that correspond with the game session summary category can be used in a media content item; and store a second rule indicating any number of media segments that correspond with the sequence category or the team summary category can be used in a media content item.

7. The one or more non-transitory computer-readable media of claim 5, wherein the media segments that correspond with the team summary category correspond with thresholds determined based on characteristics of participants of game sessions.

8. The one or more non-transitory computer-readable media of claim 1, wherein execution of the instructions causes the one or more processors to:

receive an indication of a beginning of the game session;

generate the identification for the game session in response to receiving the indication of the beginning of the game session;

transmit the identification for the game session to a computing device;

receive, from the computing device, a message comprising the identification for the game session and an indication of an end of the game session; and determine the occurrence of the predetermined event responsive to the indication of the end of the game session.

9. The one or more non-transitory computer-readable media of claim 8, wherein execution of the instructions causes the one or more processors to:

receive the data corresponding to the one or more events of the game session in a plurality of messages between a first time at the beginning of the game session and a second time at the end of the game session, each of the plurality of messages comprising the identification for the game session; and store an association between the identification for the game session and the data corresponding to the one or more events of the game session responsive to identifying the identification for the game session in each of the plurality of messages.

10. The one or more non-transitory computer-readable media of claim 1, wherein execution of the instructions causes the one or more processors to generate the media content item for the game session by:

selecting a template from a plurality of templates, each template corresponding to a different order in which to insert media segments into a media content item; and generating the media content item according to the selected template.

11. The one or more non-transitory computer-readable media of claim 1, wherein each media segment is a text string, an audio segment, or a video segment.

12. The one or more non-transitory computer-readable media of claim 1, wherein execution of the instructions causes the one or more processors to transmit the media content item to a computing device.

13. The one or more non-transitory computer-readable media of claim 1, wherein execution of the instructions causes the one or more processors to generate the media content item for the game session in response receiving an identification of the predetermined event for the game session.

14. A method for automatic media generation for game sessions, comprising:

storing, by one or more processing circuits, an identification of a game session and data corresponding to one or more events of the game session, the game session corresponding to one or more characteristics of individuals participating in the game session;

determining, by the one or more processing circuits and based on the one or more characteristics of the individuals participating in the game session, a set of criteria for selecting a set of media segments at least by:

retrieving one or more values for a category from stored data corresponding to one or more events of one or more game sessions completed prior to the game session and corresponding to the one or more characteristics of individuals participating in the game session; and calculating a threshold for the category based on the retrieved one or more values, wherein different criteria of the set of criteria correspond to different media segments;

determining, by the one or more processing circuits, which of the set of criteria is satisfied based on the stored data corresponding to the one or more events of the game session at least by determining a value of the category in the data corresponding to the one or more events of the game session exceeds the threshold; and responsive to determining an occurrence of a predetermined event, generating, by one or more processing circuits, a media content item for at least a portion of the game session based on the one or more media segments.

15. A system for automatic media generation for game sessions, comprising:

one or more processors coupled to one or more computer-readable storage media, the one or more processors configured to execute instructions stored on the one or more computer-readable storage media to:

store an identification of a game session and data corresponding to one or more events of a game session, the game session corresponding to a type of game and at least one of an age, an age range, or an experience level of individuals participating in the game session;

retrieve one or more values for a category from stored data corresponding to one or more events of one or more game sessions completed prior to the game session and corresponding to the age, the age range, or the experience level of the individuals participating in the game session;

determine a threshold for the category based at least on the retrieved one or more values, the threshold corresponding to a media segment;

determine the threshold is satisfied based on a value of the category in the data corresponding to the one or more events of the game session exceeding the threshold; and responsive to determining that the game session has ended, generate a media content item for the game session based at least on the media segment.

16. The system of claim 15, wherein the experience level comprises one or more of a participation level of a plurality of participation levels of an organization, an amount of time an individual has participated in game sessions of the type of game, a skill rating, a skill rating range, a number of game sessions an individual has participated in game sessions of the type of game, a type of an organization, or an identifier of an organization.

* * * * *